(12) United States Patent
Dunne

(10) Patent No.: US 8,786,114 B2
(45) Date of Patent: *Jul. 22, 2014

(54) POWER SUPPLY SYSTEMS

(75) Inventor: Julian Francis Dunne, Lewes (GB)

(73) Assignee: University of Sussex, East Sussex (GB)

( * ) Notice: Subject to any disclaimer, the term of this patent is extended or adjusted under 35 U.S.C. 154(b) by 253 days.

This patent is subject to a terminal disclaimer.

(21) Appl. No.: 13/318,100

(22) PCT Filed: Apr. 30, 2010

(86) PCT No.: PCT/GB2010/000862
§ 371 (c)(1),
(2), (4) Date: Dec. 16, 2011

(87) PCT Pub. No.: WO2010/125352
PCT Pub. Date: Nov. 4, 2010

(65) Prior Publication Data
US 2012/0139260 A1     Jun. 7, 2012

(30) Foreign Application Priority Data
Apr. 30, 2009   (GB) .................................. 0907506.0

(51) Int. Cl.
*H02K 7/18*     (2006.01)
(52) U.S. Cl.
USPC .......................................... 290/1 A; 290/40 R
(58) Field of Classification Search
USPC ............................................................ 290/1
See application file for complete search history.

(56) References Cited

U.S. PATENT DOCUMENTS

| | | | |
|---|---|---|---|
| 2,943,450 | A | 7/1960 | Willson |
| 3,270,723 | A | 9/1966 | Maroney |
| 3,580,228 | A | 5/1971 | Rocha |
| 3,602,203 | A | 8/1971 | Mowry |
| 4,146,020 | A | 3/1979 | Moret |
| 5,975,714 | A * | 11/1999 | Vetorino et al. ............... 362/192 |

(Continued)

FOREIGN PATENT DOCUMENTS

| | | |
|---|---|---|
| DE | 202004019630 | 5/2005 |
| DE | 102004061223 | 8/2006 |

(Continued)

OTHER PUBLICATIONS

PCT Search Report dated Oct. 4, 2010, PCT Patent Application PCT/GB2010/000862, filed Apr. 30, 2010.

(Continued)

*Primary Examiner* — Tulsidas C Patel
*Assistant Examiner* — Sean Gugger
(74) *Attorney, Agent, or Firm* — Vierra Magen Marcus LLP

(57) ABSTRACT

A power supply system comprises an internal combustion engine (20) having a pair of opposed pistons (28, 30) and cylinder (32) within which the pistons move in use, the pistons (28, 30) and cylinder together forming a combustion chamber. The pair of opposed pistons (28, 30) and the cylinder (32) are each arranged to rotate, in use, about a common axis of rotation A with respect to an associated electric generator arrangement (22) so as to generate an electric output. The pair of opposed pistons (28, 30) are also arranged to together form a mass-elastic system that is capable of resonance and further arranged such that combustion in the combustion chamber causes the pistons (28, 30) to oscillate relative to each other about the common rotational axis (A).

18 Claims, 8 Drawing Sheets

(56) References Cited

U.S. PATENT DOCUMENTS

| | | | |
|---|---|---|---|
| 7,318,506 B1 * | 1/2008 | Meic et al. | 290/1 A |
| 2005/0016493 A1 | 1/2005 | Hoose | |
| 2008/0178847 A1 * | 7/2008 | Kudarauskas et al. | 123/46 R |
| 2008/0245345 A1 | 10/2008 | Huettlin | |
| 2011/0204650 A1 | 8/2011 | Dunne | |

FOREIGN PATENT DOCUMENTS

| | | |
|---|---|---|
| DE | 102005062529 | 6/2007 |
| GB | 594469 | 11/1947 |
| GB | 1159107 | 7/1969 |
| GB | 2356670 | 5/2001 |
| GB | 2454360 | 5/2009 |
| GB | 2454360 B | 4/2010 |
| WO | WO0158211 | 8/2001 |
| WO | WO2006118437 | 11/2006 |

OTHER PUBLICATIONS

PCT Written Opinion of the International Searching Authority dated Oct. 4, 2010, PCT Patent Application PCT/GB2010/00862, filed Apr. 30, 2010.

PCT Search Report dated Mar. 11, 2009, PCT Patent Application PCT/GB2008/003697, filed Oct. 31, 2008.

Search Report dated Aug. 18, 2008, GB Patent Application GB0721625.2.

GB Combined Search and Examination Report dated Mar. 2, 2009, GB Patent Application GB0820030.5 (GB2454360).

English translation of Abstract of German Patent DE 102004061223.

English translation of Abstract of German Patent Application DE202004019630.

Office Action dated Sep. 19, 2012, U.S. Appl. No. 12/740,669.

PCT International Preliminary Report on Patentability dated Nov. 1, 2011, PCT Patent Application PCT/GB2010/000862, filed Apr. 30, 2010.

Response to Office Action filed Jan. 22, 2013 in U.S. Appl. No. 12/740,669, 8 pages.

Notice of Allowance and Fee(s) Due dated Apr. 2, 2013 in U.S. Appl. No. 12/740,669, 13 pages.

* cited by examiner

POWER SUPPLY SYSTEMS

The present invention relates to power supply systems and in particular to systems which use an internal combustion engine to drive an electric generator.

It is known, for example in hybrid vehicle powertrain systems, to use a conventional multi-cylinder internal combustion engine to drive an electric generator. However, because in such systems the internal combustion engine uses a slider-crank mechanism, there are, as is known in the art, large piston-cylinder side wall forces and corresponding losses due to piston-cylinder friction.

It is also known to use single-cylinder engines to drive electric generators, as they allow for a reduction in the friction losses associated with multi-cylinder engines. An exemplary known single-cylinder engine and generator arrangement is shown in FIG. 1. This engine comprises a fixed cylinder 1 and a free piston 2. In the arrangement, the piston 2 is connected, via a piston rod 3, to a linear electromagnetic motor-generator 4, and its motion is controlled by appropriately controlling the motor-generator 4. This device thus avoids the problem of the relatively large piston-cylinder side wall forces associated with slider-crank mechanisms.

A further known energy converter that comprises a free piston engine and generator arrangement is disclosed in WO 01/58211, and is shown in FIG. 2. In this energy converter, two fixed cylinders 11, 12 are provided, within each of which moves a free piston 13, 14. The pistons 13, 14 are each connected, via a spring 15, 16, to a linear electromagnetic motor-generator (armature) 18. As will be appreciated by those skilled in the art, in use, the springs 15, 16 cause the motor-generator (armature) 18, in combination with the pistons 13, 14 and piston rods, to oscillate at a particular frequency, i.e. the resonant (natural) frequency of the oscillating system. This device therefore allows an electric current with a fixed frequency, which corresponds to the resonant (natural) frequency of the system, to be easily generated.

In such reciprocating engine driven systems (e.g., those shown in FIGS. 1 and 2), however, due to their very nature, the relative speed between the moving and static parts of the motor-generator arrangement (and which is a key factor in determining the amount of energy that can be generated) is fixed by the speed of the piston, thereby restricting the practical applications where such systems can be used.

The Applicants accordingly believe that there remains scope for improvements to power supply systems that use an internal combustion engine to drive an electric generator.

According to a first aspect of the present invention, there is provided a power supply system, comprising:

an internal combustion engine having a pair of opposed pistons and one or more cylinders within which the pistons move in use, the pistons and cylinder or cylinders together forming a combustion chamber or chambers of the engine, and wherein the pair of opposed pistons and the one or more cylinders are each arranged to be rotatable in use about a common axis of rotation;

the pair of opposed pistons being further arranged such that combustion in a combustion chamber or chambers of the engine can cause the pistons to oscillate relative to each other about their common rotational axis, and the opposed pistons further being arranged to together comprise a mass-elastic system that is capable of resonance;

the system further comprising:

an electric generator arrangement associated with the pair of opposed pistons for generating an electrical output from the motion of at least one of the pistons in use.

According to a second aspect of the present invention, there is provided a method of generating an electrical output using an internal combustion engine having a pair of opposed pistons and one or more cylinders within which the pistons move in use, the pistons and cylinder or cylinders together forming a combustion chamber or chambers of the engine, and wherein the pair of the opposed pistons and the one or more cylinders are each arranged to be rotatable in use about a common axis of rotation, the pair of opposed pistons being further arranged such that combustion in a combustion chamber or chambers of the engine can cause the pistons to oscillate relative to each other about their common rotational axis, and the opposed pistons further being arranged to together comprise a mass-elastic system that is capable of resonance, the method comprising:

using combustion in the combustion chamber or chambers to cause relative oscillatory motion of the pistons about their common rotational axis; and using a generator arrangement associated with the pair of opposed pistons so as to generate an electrical output from the motion of at least one of the pistons.

The present invention comprises an internal combustion engine that is coupled to a generator arrangement and which can be used to drive the generator arrangement so as to generate an electrical output.

However, in the present invention, unlike in prior art systems that use internal combustion engines to drive an electric generator, the internal combustion engine comprises a pair of opposed pistons that move within one or more cylinders, wherein the pistons and the cylinder(s) are each able to rotate about a common (shared) axis of rotation.

By allowing both the pistons and cylinder(s) to be rotatable about the rotational axis, rather than one or more of these components being fixed, their relative motion in use can more readily be dynamically balanced, such that the engine can more readily be configured to produce a zero external torque without the need for further components, e.g. counterweights, to be used. Moreover, because the motion of the pistons and cylinder(s) is rotational, rather than linear, this facilitates the provision of a more compact, but still dynamically balanced, engine.

The pair of opposed pistons are further arranged to oscillate with respect to each other about their common axis of rotation in use (i.e. such that they move towards and away from each other in an oscillatory fashion, such that there can be, and is, relative angular motion between the pistons about the axis of rotation, in use).

In other words, during combustion when one piston, for example, moves in a clockwise direction about the rotational axis, the other (opposing) piston, at the same time, moves in an anticlockwise direction about the axis relative to the first piston (and vice-versa). This relative oscillation provides the relative (angular) motion of the pistons that is necessary for the operation of the internal combustion engine (i.e. allows the pistons (and the cylinder(s)) to form a combustion chamber having a variable volume in which fuel can be combusted in use to drive the movement of the pistons, and thus the engine).

In a preferred embodiment, as will be discussed further below, the pistons and cylinder(s) all rotate completely (spin) about their common axis with a common mean angular velocity, and the relative oscillatory motion between the pair of opposed pistons is superimposed upon this common, unidirectional rotation. In such arrangements, although the pistons and one or more cylinders will each rotate in the same direction overall, e.g. in a clockwise or anticlockwise direction, the absolute angular velocity of each of the pistons in that direction will differ relative to each other over time (due to their relative oscillatory motion) and differ relative to the preferably substantially constant angular velocity of the one or more cylinders, such that a variable volume combustion chamber or chambers is still formed between the pair of opposed pistons and the one or more cylinders.

As will be appreciated, by allowing the variable volume combustion chamber(s) to be formed by the relative oscillatory movement of the pair of opposed pistons, there is no requirement for the cylinder or cylinders to themselves oscillate in use.

Accordingly, in a preferred embodiment, the one or more cylinders, in use, do not oscillate (in the manner of the pair of opposed pistons), but instead are either substantially stationary or rotating at a substantially constant angular velocity about the common axis of rotation.

In effect, therefore, the one or more cylinders within which the pistons move can, and preferably do, remain in a substantially constant location with respect to a point in the envelope defined by the movement of the pistons. In other words, each of the one or more cylinders preferably remains at a substantially fixed angular position relative to a particular relative angular position of the pistons (e.g. relative to the angular positions of the pistons when the combustion chamber or chambers (formed between the pair of opposed pistons) is at its maximum volume).

It will therefore be recognised that the angular acceleration of the one or more cylinders, when the internal combustion engine is in a normal (steady-state) mode of operation (e.g. when the cylinder or cylinders are not being accelerated, for example, to a constant angular velocity as is discussed in more detail below), is preferably substantially zero. This has the advantage that any components coupled (mounted) to the one or more cylinders, such as one or more fuel injectors, sensors, etc, and which are often sensitive to (disturbed by) changes in velocity, are not subjected to oscillatory accelerations when the engine is in use.

The pair of opposed pistons in the system of the present invention are further arranged to form a mass-elastic system, which at its simplest level can be described mathematically by two discrete masses connected by an elastic spring. The mass-elastic system should be capable of resonance, i.e. it has at least one resonant (natural) frequency at which resonance (amplified oscillatory motion) occurs. The provision of a system that can resonate in use facilitates, inter alia, and as will be discussed further below, more efficient and effective generation of electricity using the system.

The pistons can be arranged to form such a mass-elastic system in any suitable and desired manner. For example, in a preferred embodiment, the pistons each engage (in use) one or more resilient (elastic) members, e.g., and preferably, one or more springs (e.g. helical springs, torsion springs or the like), for this purpose.

Thus, in a particularly preferred embodiment, the pair of opposed pistons each engage (or are arranged to engage in use) one or more resilient members, e.g., and preferably, one or more springs, such that they can oscillate (resonant) relative to each other about their common rotational axis. In other words, in a preferred embodiment, the mass-elastic system comprises the pair of opposed pistons and one or more resilient (elastic) members, such as springs, arranged such that the pistons can (and will) elastically oscillate relative to each other (via the action of the resilient member(s)) in use.

The pistons may, in some embodiments, directly engage (be coupled to) the one or more resilient members. Alternatively, and as discussed in more detail below, the pistons may (indirectly) engage the one or more resilient members, for example, via means for supporting one or both the pistons.

In one embodiment, one of the pistons (of the pair of opposed pistons) engages (is coupled to) one resilient member, e.g. spring, and the other (opposing) piston engages another (different) resilient member, e.g. spring, such that they will elastically oscillate relative to each other in use.

In other embodiments, the pistons engage (are coupled to) the same resilient member or members (e.g. spring or springs), such that they will oscillate relative to each other in use. For example, the pistons may be coupled to each other (mutually restrained relative to each other) by a resilient (e.g. elastic) coupling, such as by being joined to each other by, or by each respectively engaging in use, a resilient (e.g. elastic) member or members arranged between the pair of opposed pistons.

Thus, in a particularly preferred embodiment, the pistons are coupled to each other using, and/or engage (in use), one or more resilient members, e.g., and preferably, one or more springs, so as to form the mass-elastic system.

The pistons can be, and in some embodiments are, arranged in a mass-elastic system using one or more helical springs. However, as will be appreciated by those skilled in the art, such springs can stretch radially when, and as discussed in more detail below, the pistons are rotating (spinning) in use, thereby resulting in unwanted friction forces. Accordingly, in particularly preferred embodiments, the pair of opposed pistons are instead arranged in a mass-elastic system using one or more torsion springs, which do not experience (are not susceptible to) the same problems in use.

Thus, in a particularly preferred embodiment, the pistons are coupled to each other (directly or indirectly) by one or more torsion springs such that they can oscillate (resonant) relative to each other about their common rotational axis.

In other less preferred embodiments, a circumferentially extending resilient (e.g. elastic) member or members (e.g. helical spring or springs) is or are arranged at, and/or between, respective ends of the pair of pistons, so as to form the required mass-elastic system. In this case the ends of the pistons that are not internal to the combustion chamber preferably each engage (and are preferably connected to) a resilient member (spring).

In another less preferred embodiment, respective springs of a pair of pre-compressed (helical) springs could be arranged to engage the respective ends of the pair of pistons, such that if the pistons were to be disturbed, the effect of the springs would be to cause oscillation about a relative equilibrium position.

The mass-elastic system formed by the pair of opposed pistons should be such that combustion in the variable volume chamber or chambers formed between the pistons and the cylinder(s) within which they move can cause the system (the pair of pistons) to resonate (i.e. such that under the action of the periodic gas pressures from (appropriate) combustion, resonance (i.e. an amplified relative oscillatory motion between the pistons) occurs).

Subject to their relative resilient constraint to each other to form the resonant mass-elastic system as discussed above, the pair of opposed pistons are otherwise both able to orbit (spin) about their axis of rotation. Similarly, each of the one or more cylinders are also able to orbit (spin) about the common axis of rotation. This allows a given "spin" to be imposed on the one or more cylinders and the pair of opposed pistons (in addition to the angular oscillation (resonance) of the pistons), which can be advantageous in terms of electricity generation, as will be discussed further below. Accordingly, in a particularly preferred embodiment, the pair of opposed pistons, and each of the one or more cylinders, are able to orbit (spin) about their axis of rotation both in a clockwise and an anticlockwise direction.

In a particularly preferred embodiment, the one or more cylinders and the pair of opposed pistons rotate (spin) together, in use, about their axis of rotation, with the relative oscillatory motion of the pistons being superimposed on the angular velocity of the rotation (spin). In other words, the pistons and cylinder(s) can preferably, save for the relative oscillatory motion of the pistons, be arranged to rotate about the axis of rotation as if "locked" together as one system.

In a particularly preferred embodiment, neither the pair of opposed pistons or the one or more cylinders are (mechanically) constrained or fixed relative to their axis of rotation. In other words, save for the motion of the pistons being constrained relative to each other by the resilient coupling to form the mass-elastic system as discussed above, the pistons and cylinder(s) are preferably each, in themselves, capable of rotating (spinning) completely freely about their axis of rotation. This has the advantage that a dynamically balanced system can be more readily obtained, and there can, for example, be zero net torque about the axis of rotation in use.

The pair of opposed pistons and the one or more cylinders may be formed and arranged in any desired and suitable manner. As will be appreciated by those skilled in the art, the pistons need to co-operate (mate) in use with the cylinder(s) so as to form a variable volume combustion chamber or chambers through their relative rotational motion. However, subject to this requirement, they can otherwise be constructed as desired.

In a particularly preferred embodiment, the pair of opposed pistons are each formed as toroidal sections that move within one or more toroidal-section shaped cylinders. The use of toroidal-section shaped opposed pistons that move within (mate with) one or more toroidal section-shaped cylinders (so as to form a variable volume combustion chamber(s)) can allow the use of state-of-the-art combustion techniques, and can avoid combustion chamber sealing problems commonly found with conventional rotary piston-cylinder assemblies (such as the Wankel engine).

For example, and in a particularly preferred embodiment, the pair of opposed, preferably toroidal-section shaped, pistons move within a single, preferably toroidal-section shaped, cylinder.

As will be appreciated, the single cylinder in such embodiments may be an open cylinder, i.e. be "open" at both ends such the cylinder takes the form of a hollow tube.

Alternatively, and in a preferred embodiment, the single cylinder may comprise a (stem) end cover at each end of the cylinder (to effectively form a closed cylinder). One or other of the (stem) end covers, and preferably both of the end covers, may be, and preferably are, formed integrally with the single cylinder. Utilising a "closed" cylinder of this form is advantageous as it enables inter alia, as will be discussed in more detail below, a passive means for maintaining the cylinder in a desired alignment with a position within the envelope defined by the movement of the pistons to be provided.

In another embodiment, it is also contemplated that the single cylinder may comprise a partition (wall) to form two separate chambers within the cylinder such that, for example, the cylinder comprises a first volume within which one of the pair of opposed pistons moves and a second volume within which the other of the pistons moves. Preferably, the partition (wall) is positioned within the cylinder such that the volume of the two chambers are the same, i.e. the first volume equals the second volume. In other words, the partition (wall) is preferably positioned halfway along the length of the cylinder (or halfway along the arc length of the cylinder when the cylinder is toroidal-section shaped).

Such embodiments, i.e. in which the single cylinder is divided so as to effectively double the number of cylinders (and thus also the number of combustion chambers), can be beneficial in that it allows the power-to-weight ratio of the internal combustion engine to be increased (albeit at the expense of the need to ensure that the combustion processes on either side of the partition (wall), i.e. in each combustion chamber, are phased appropriately and maintained at a similar magnitude).

It is also contemplated, in other similar embodiments, that instead of using a single cylinder with a partition (wall), the one or more cylinders of the engine may comprise two cylinders, each being closed at least at one end (preferably the blind end), and positioned back-to-back (thereby forming a similar structure to that of the partitioned single cylinder). As will be appreciated, in such embodiments, one of the pair of opposed pistons moves within (mates with) a first of the two cylinders (thus defining a first combustion chamber therebetween) and the other of the pistons moves within (mates with) a second of the two cylinders (thus defining a second combustion chamber therebetween). One, and preferably both, of the two cylinders may, as discussed above, comprise a (stem) end cover (to effectively form a closed cylinder).

The pair of opposed pistons may be supported and arranged to rotate and oscillate about their common axis of rotation in any suitable and desired manner. For example, in a preferred embodiment, each of the pistons is supported on a support, or between a plurality of supports, that is (are) arranged to rotate (be rotatable) about the common axis of rotation. In this case, rotation of the piston support or supports provides the rotation of the associated piston.

Similarly, the one or more cylinders may be supported and arranged to rotate about the common axis of rotation in any suitable and desired manner. For example, in a preferred embodiment, the one or more cylinders are supported on a support, or between a plurality of supports, that is (are) arranged to rotate (be rotatable) about the common axis of rotation. As is the case with the piston support or supports, the rotation of the cylinder support or supports provides the rotation of the one or more cylinders.

(Accordingly, as will be appreciated any references herein to rotating (driving the motion of) one or other of the pair of opposed pistons and/or the one or more cylinders are intended, unless the context requires otherwise, to encompass both directly rotating the piston(s) and/or cylinder(s) and, in those embodiments in which the pair of opposed pistons and/or the one or more cylinders are supported on a support or plurality of supports, to (indirectly) rotating the piston(s) and cylinder(s) by rotating the respective support or supports.)

Thus, in a particularly preferred embodiment, one of the pair of opposed pistons is mounted on a first support (or between a plurality of first supports) that is (are) able to rotate about a rotational axis, the other of the pistons is mounted on a second support (or between a plurality of second supports), and the one or more cylinders are mounted on a third support (or between a plurality of third supports), wherein each of the supports are able to rotate about the common axis of rotation. Preferably the supports are (rotatably) mounted on a common axle (which then forms the axis of rotation). As discussed above, the supports are preferably free to rotate about the axis of rotation, and are not mechanically constrained or fixed relative to the axis of rotation (their axle).

The supports for the pistons and cylinder(s) can take any suitable and desired form, but in a preferred embodiment comprise discs, which are preferably mounted on, and able to rotate about, a common axle.

For example, in a particularly preferred embodiment, the engine comprises a first piston (of a pair of opposed pistons) mounted between two supporting discs and a second piston (of the pair of opposed pistons) mounted on a supporting disc that is separate to, and preferably between, the two discs that support the first piston. Preferably, in such an embodiment, the one or more cylinders within which the pair of opposed pistons move (oscillate) to form one or more combustion chambers are mounted between two supporting discs that are separate to the discs that support the pair of opposed pistons, and wherein the discs that support the pair of opposed pistons are preferably positioned between the two discs supporting the one or more cylinders. (As will be appreciated, when two discs are used to support a component or components, such as, for example, the one or more cylinders or the first piston, since the two discs are connected by the component or components, they essentially comprise a single unit (moving part).)

In this latter embodiment, the pair of opposed pistons are arranged in a mass-elastic system preferably by coupling one of the discs that supports the first piston and the disc that supports the second piston by a first resilient member, and coupling the other one of the discs that supports the first piston and the disc that supports the second piston by a second resilient member. The first and/or second resilient members preferably comprise a torsion spring (mounted about the common axle), and more preferably a machined torsion spring that possess the desired dimension, pitch and spring characteristic.

The use of two torsion springs in the above embodiment, as will appreciated by those skilled in the art, would allow any axial forces that typically would be generated by a single torsion spring to be avoided. For example, and in a particularly preferred embodiment, the first resilient member comprises a torsion spring having a first pitch and the second resilient member comprises a torsion spring having a second, opposing, pitch. Therefore, any axial (unbalancing) force that may be generated by the torsion spring forming the first resilient member is cancelled out by an opposing (equal and opposite) axial force generated by the torsion spring forming the second resilient member.

The pair of opposed pistons and the one or more cylinders can be attached to their respective supports (e.g. discs) in any suitable and desired manner. For example, the pistons and cylinder(s) can be integrally formed with their supports and/or fixedly mounted to their supports using mechanical means, etc. In one preferred embodiment, the pistons and cylinder(s) are tangentially mounted on their respective supports.

The pair of opposed pistons and/or the one or more cylinders, together with their associated supports (e.g. discs) where appropriate, are preferably arranged and/or constructed to have substantially equal, and preferably exactly equal, mass distributions. This helps to ensure that the engine is dynamically balanced in use, thereby avoiding potentially harmful out-of-balance (inertia) forces and moments. This can then avoid the need to use further components such as counterweights to dynamically balance the engine, thereby increasing the power to weight ratio of the engine.

In a preferred embodiment, the engine further comprises restraining means to restrain and preferably prevent the possibility of a collision between the pair of opposed pistons and/or one or other of the pistons and a cylinder in use. This is desirable because such collisions could cause damage to the pistons and/or cylinder(s), and/or a reduction in the efficiency of the engine. For example, in use, collisions could occur in certain circumstances between the crowns of the pair of opposing pistons (e.g. in embodiments wherein the one or more cylinders comprise a single cylinder without a partition (wall)) when the pistons are each at top dead centre (TDC). Similarly, collisions could occur between the crown of one of the pistons and the cylinder within which the piston is moving, for example, (i) when the piston is at top dead centre (TDC), the crown of the piston may in some embodiments collide with an end of the cylinder, or (ii) when the piston is at bottom dead centre (BDC), the underside of the piston may in some embodiments collide with a stem end cover of the cylinder.

Thus, in a preferred embodiment, the motion of the pistons and cylinder(s) relative to each other is constrained to reduce, and, preferably, prevent, collisions between the pistons and/or a piston and cylinder in use. These restraining means can take any suitable and desired form. For example, the resilient member (e.g. spring) coupling the pair of opposed pistons to form the mass-elastic system could also be used and/or configured to restrain or prevent colliding motion of the pistons. In a preferred embodiment, however, the engine further comprises one or more annular spigots and/or one or more blind air-filled dummy cylinders that co-operate in use to cushion and, preferably, prevent collisions between the pistons and/or a piston and cylinder in use.

As will be appreciated by those skilled in the art, the internal combustion engine will need to include suitable means for transferring and/or injecting fuel and air into the combustion chamber or chambers of the engine (formed by the pair of opposed pistons and the one or more cylinders) in use, and, similarly, suitable means for transferring and/or extracting exhaust gases resulting from combustion from the chamber or chambers in use. This can be achieved in any suitable and desired manner.

The means for transferring fuel and air into, and exhaust gases out of, the combustion chamber or chambers may comprise one or more suitable inlet and exhaust valves, and, e.g., a pump for injecting fuel and/or air into the combustion chamber or chambers.

Conventional poppet valves with straight stems could, for example, be used. Preferably, however, the valves are arranged such that their motion in use (as they open and close) is along (part of) an arc that surrounds the common rotational axis of the pistons and cylinder(s). This may be, and is preferably, achieved by the valves having (appropriately) curved stems and being arranged to be rotatable about the common rotational axis in use. Accordingly, the valves, in use, will be moved between first (open) angular positions and second (closed) angular positions by rotary motion of the stem about the rotational axis (in effect, the valves will lift and close in a circular orbital motion (along an arc rather than along a chord)). This embodiment is advantageous in that it allows for the engine to remain dynamically balanced even during valve operation (during the opening and closing of the valves).

In a particularly preferred embodiment, the engine further comprises a static support shaft around which the pistons and cylinder(s) rotate in use (the axis of the support shaft corresponding to the common axis of rotation of the pistons and cylinder(s)), and preferably the means for transferring fuel and air into, and exhaust gases out of, the (rotating) combustion chamber or chambers comprises one or more passages in the support shaft that are in selective fluid communication with the chamber or chambers, for example, by the opening and closing of suitable inlet and exhaust valves.

The engine may also comprise, for example, suitable spark plug arrangements and controls (a controller) for controlling operation of the engine in use.

At least some of these various elements may, for example, be suitably mounted or coupled to the supports for the pistons. Alternatively, some of the elements, and preferably those elements that are more adversely affected by oscillatory accelerations, may be mounted or coupled to the one or more cylinders of the engine and/or the support or supports for the one or more cylinders. (As discussed above, in a preferred embodiment, the one or more cylinders, in use, do not oscillate (in the manner of the pair of opposed pistons), but instead are either substantially stationary or rotating at a substantially constant angular velocity about the common axis of rotation.)

As discussed above, the one or more cylinders within which the pair of opposed pistons move can, and preferably do, remain in a substantially constant location with respect to a point in the envelope defined by the movement of the pistons (i.e. relative to a particular relative angular position of the pistons). It will be appreciated, however, the relative position of the one or more cylinders may, whilst the engine is in use, vary slightly over a period of time. (It will, however, be recognised that the movement of the one or more cylinders will be neglible when compared with, for example, the oscillatory movement of the pair of opposed pistons).

Thus, in a particularly preferred embodiment, the internal combustion engine further comprises means for maintaining the alignment of each of the one or more cylinders with respect to a particular relative angular position of the pistons. For example, the means may be arranged to ensure that the relative positions of the one or more cylinders are maintained such that they are appropriately aligned with inlet and exhaust ports and/or valve ports for transferring fuel and air into, and exhaust gases out of, the (rotating) combustion chamber or chambers of the engine (formed by the cylinder or cylinders).

The alignment maintaining means of the engine may be arranged to maintain the relative position of the one or more cylinders with respect to any suitable and desired point within the envelope defined by the movement of the pistons. In a particularly preferred embodiment, however, the alignment maintaining means is arranged to keep each of the one or more cylinders in alignment with a point midway between the pair of opposed pistons.

The means for maintaining the alignment of each of the one or more cylinders can take any suitable and desired form.

The alignment maintaining means may comprise a passive means, such as by utilising the underside air pressure of the pair of opposed pistons to maintain the position of the cylinder(s) with respect to a particular position of the piston. For example, in a particularly preferred embodiment, and when the one or more cylinders comprise (stem) end covers (with the rod of the associated piston passing through a gland in the end cover), the alignment maintaining means comprises a first volume defined between the underside of one of the pair of opposed pistons and the associated end cover of the cylinder (through which the piston moves) and a second volume defined between the underside of the other of the pair of opposed pistons and the associated end cover of the cylinder (through which the piston moves). As will be appreciated, in such an embodiment, when the engine is in use, a "clockwise" force caused by air pressure in the first volume and a (counter) "anti-clockwise" force caused by air pressure in the second volumes has the effect of maintaining the alignment of the one or more cylinders. In other words, when a cylinder becomes misaligned (i.e. "drifts" from its desired position relative to a particular relative angular position of the pistons), a restoring force generated by the difference in magnitude of the force from the first volume and the force from the second volume causes the cylinder to move towards (align with) its appropriate position.

The first and second volumes can be arranged (constructed) so that each of the one or more cylinders can be maintained in alignment with any desired position within the envelope defined by the movement of the pistons. For example, by arranging the first volume to be larger than the second volume, the one or more cylinders would be aligned with a point closer to the second volume (and of course vice-versa). In a particularly preferred embodiment, however, the first and second volume are of the same size such that each of the one or more cylinders are maintained at a position midway between the pair of opposed pistons (that move within the one or more cylinders).

As will be appreciated, in the above embodiment, the air pressure in the first and second volumes acts to generate a restorative force to adjust the position of the cylinder(s) when it becomes misaligned. A similar effect may also be achieved using any suitable and desired means, for example: using magnets (e.g. by positioning repelling magnets on the underside of each of the pistons); using one or more spigots (e.g. wherein an air-cushioning effect is created by spigot(s) positioned on the underside of each of the pistons); using one or more resilient members, e.g. springs and/or a durable material (e.g. with the resilient member(s) acting as a nudging buffer on the pistons); or providing one or more ports, wherein the ports are arranged, e.g., to release air from the underside of the pistons, the air travelling over suitable means, such as vanes or blades, to generate the necessary restorative force on the one or more cylinders.

The alignment maintaining means may additionally, or alternatively, comprise an active means, such as using a motor, e.g. an electric stepper motor, to drive, and thus control the position of, the one or more cylinders.

In embodiments wherein the alignment maintaining means comprises an active means, such means, e.g. a motor, may also be used to adjust the position (within the envelope defined by the movement of the pistons) to which the one or more cylinders are aligned, including, for example, when the engine is in use.

(As will be appreciated, the various passive alignment maintaining means may be adapted, as required, so as to similarly adjust the position to which the one or more cylinders are aligned when the engine is in use.)

The internal combustion engine in the present invention can comprise a single pair of opposed pistons, or it may comprise two or more, e.g. a plurality of, pairs of opposed pistons with, e.g., each pair of pistons being mounted on the same, common axle (axis of rotation). As will be appreciated, using a plurality of pairs of opposed pistons in the engine of the present invention has the advantage of increasing the power-to-weight ratio of the engine.

In embodiments of the present invention in which the engine comprises a plurality of pairs of opposed pistons, each of the pairs of opposed pistons are preferable supported on the same support, or between the same plurality of supports. Moreover, in such embodiments, the engine preferably further comprises means for deactivating one or more of the plurality of pairs of opposed pistons (although at least one pair of opposed pistons must always be active (in operation)). Such means, as will be appreciated, allows the power generated by the engine to be efficiently reduced, if desired (required).

The pair or pairs of opposed pistons may comprise pistons of any suitable and desired type. For example, the (each) pair of opposed pistons may comprise a pair of double-headed pistons, with the pair of pistons moving, e.g., within two single cylinders or two separate back-to-back cylinder assemblies (as discussed above). In a preferred embodiment, however, the (each) pair of opposed pistons comprises a pair of single-crowned (single-headed) pistons, with the pair of pistons moving, e.g., within a single cylinder or a back-to-back cylinder assembly (as discussed above).

The electric generator arrangement of the system of the present invention can be arranged and constructed as desired so as to generate electricity from the motion of at least one, and preferably both of, the pair of opposed pistons.

As will be appreciated from the above, the electricity will be generated from the rotational motion of one or both of the pair of opposed pistons (i.e. the rotating piston or pistons will form the rotor part of the generator) and so there will need to be a fixed stator that at least one, and preferably both of, the pair of opposed pistons can move relative to.

Such a stator can be provided as desired, but in a preferred embodiment is provided on or in a fixed casing of the system, that surrounds, at least in part, the outer circumference of the pair of opposed pistons. Thus, in a preferred embodiment, the internal combustion engine includes, and preferably is contained within, a fixed casing to which, inter alia, the stator of the generator is mounted.

The necessary magnetic flux generating means and conductors (windings) of the generator can be mounted on the stator or rotor of the generator, respectively, as desired. For example, the magnet flux generating means (which may be in the form of electromagnets or permanent magnets, etc.) may be mounted on the fixed casing of the system so as to at least partially surround the rotating pistons, thereby forming a stator part of the generator, and one or other of the pistons (and preferably both) and/or their supports could carry the conductors of the generator arrangement.

In a particularly preferred embodiment, there is a separate generator part (arrangement) for each of the pistons of the pairs of opposed pistons. In other words, the generator arrangement preferably comprises two (twin) generator parts (arrangements), one for (in respect of) the first piston (of the pair of opposed pistons), and one for (in respect of) the other piston (of the pair of opposed pistons), which parts can preferably be operated independently of each other. In this case, each of the pair of pistons will, e.g., and preferably, each have their own respective stator arrangements. Having separate generator arrangements for each of the pistons facilitates operating and using the pistons independently of each other, particularly where the generator arrangements are also used for motoring control of one or other of the pistons (as will be discussed further below).

In a particularly preferred embodiment, the generator arrangement (and both or all parts of the generator arrangement where there are separate generator parts (arrangements) for the pistons) can also be operated as a motor, i.e. be used to drive the rotational movement of one or other, and preferably both, of the pair of opposed pistons, in addition to being used to generate electricity from the motion of the pistons. In the "motoring" case, an electric current will be applied to the conductors of the generator to induce movement of one or other, and preferably both, pistons relative to the stator of the generator (i.e. about the axis of rotation) as is known in the art.

As will be discussed further below, the ability to drive the piston(s) using the generator arrangement can provide significant advantages in terms of controlling the operation of the overall system.

Thus, in a particularly preferred embodiment, the system of the present invention comprises a motor-generator arrangement that can be used to generate electricity from the motion of one or other, and preferably both, pistons (of the pair of opposed pistons), and that can be used to drive and/or control rotational motion of the piston or pistons. (The term "motor-generator" is used herein to mean an arrangement that can be used either as an electric motor or as a generator.)

Similarly, in a particularly preferred embodiment, each of the pistons of the pair of opposed pistons have their own, independent, motor-generator arrangements. This would then allow, e.g., independent "motoring" control of the pistons when the engine is in use. Indeed, it is preferred that each of the pistons can be motored (controlled) independently of each other in use.

As will be appreciated by those skilled in the art, the generator or motor-generator arrangement will also include appropriate electrical connections, controllers, etc., to allow the generated electricity to be provided to a load, such as a battery to be charged, and/or an electric appliance, etc., and to provide controlled motoring of the piston(s) (where provided).

As will be appreciated from the above, the basic operation of the system of the present invention will be to cause and use relative motion between the rotor part (one or other, and preferably both, of the pair of opposed pistons and/or their respective supports (e.g. discs)) and the stator part (or parts) of the generator arrangement to generate electricity.

In use, the output electrical energy will, in effect, be generated by the relative oscillation (resonance) between the pair of opposed pistons (in fact by the relative oscillation between one or other, and preferably both, of the pistons and the stator of the generator that is a consequence of the relative oscillation of the pistons) that is caused by combustion in the chamber or chambers formed by the pistons and cylinder(s). In effect, periodic combustion in the combustion chamber or chambers of the engine will be used to drive oscillation (resonance) of the pair of opposed pistons, and thereby generate output electrical energy. The Applicants have found that, in preferred embodiments of the present invention at least, the output electrical energy generated by this can, on average, equal the work done by the expanding combustion gases.

Thus, in a particularly preferred embodiment, in use of the system of the present invention, periodic combustion in the chamber or chambers of the engine is used drive relative oscillation (and preferably resonance) between the pair of opposed pistons (and thereby to generate electricity), and the arrangement is such that periodic combustion in the combustion chamber or chambers formed by the pistons and cylinder(s) can cause (drive) relative oscillatory motion (and preferably resonant motion) between the pistons.

Most preferably, the pistons are driven in use to cause resonant relative oscillation (resonance) between the pair of opposed pistons. The use of appropriately controlled resonance of the pistons can facilitate the use of significantly lower control torques (this is discussed further below), and lower magnetic flux densities for a given level of electrical power generation, as compared, e.g., to linear arrangements such as that shown in FIGS. 1 and 2.

The ability to use lower magnetic flux densities also means that there is less need to, or there can be no need to, use higher strength magnets (which can often be expensive and can introduce a number of safety issues), and can reduce the level of any peak currents that may be induced in use (which is safer and reduces any losses associated with such currents).

It would be possible for the pistons' only motion in use to be their relative oscillatory motion and resonance (i.e. for them to have zero overall (net) angular velocity).

However, in a particularly preferred embodiment, the pistons are arranged to rotate together at a given mean angular velocity, with their relative oscillation (resonance) then being superposed on that common mean angular velocity. Thus, in a particularly preferred embodiment, the pistons have a common, preferably selected, spin relative to the stator, in addition to their angular oscillation (resonance).

Thus, in a particularly preferred embodiment the pistons are arranged, in use, to rotate (spin) about their axis of rotation at a given common (mean) angular velocity, with relative oscillation (resonance) between the pair of pistons being superposed on that common angular velocity. In other words, the pistons will both rotate in the same direction overall (e.g. clockwise or anticlockwise) with the same, non-zero, mean angular velocity in that direction, but they will relatively accelerate away from and towards each other whilst doing so as they oscillate (and thus their absolute angular velocity changes) relative to each other. Thus, in these arrangements, the absolute angular velocity of the pistons will be positive, but not constant.

As will be appreciated, the one or more cylinders are preferably also arranged, in use, to rotate (spin) about the common axis of rotation at a given common (mean) angular velocity, and preferably at the same common (mean) angular velocity as the pair of opposed pistons.

This provides a number of advantages. For example, an advantage of spinning the pistons together at a common mean angular velocity is that a much higher absolute angular velocity relative to the stator part or parts of the generator can be achieved. This facilitates more efficient and effective electricity generation. This is because the electrical power is generated by the absolute rotation of one or other, and preferably both, of the pistons, and so imposing a higher absolute rotation (spin) allows more effective electrical power generation.

A further advantage is that the absolute angular velocity of the generator system can be set independently of the combustion operation (requirements) such that, for example, the generator efficiency can be optimised independently of the combustion efficiency requirements.

Indeed, it is an important advantage of a rotary arrangement that the pistons can be rotated together in this fashion in addition to the relative motion caused by combustion.

Moreover, the Applicants believe that a power supply system comprising an internal combustion engine having a pair of opposed pistons that can both oscillate relative to each other and can spin together at a greater than zero common mean angular velocity may be new and advantageous in its own right, and not just in the context of a resonant, e.g., dynamically-balanced, system. This is because, for example, spinning the pistons at a common, positive mean angular velocity will as discussed above, facilitate more efficient and effective electricity generation in any event.

Thus, according to a third aspect of the present invention there is provided a power supply system, comprising:

an internal combustion engine having a pair of opposed pistons and one or more cylinders within which the pistons move in use, the pistons and cylinder or cylinders together forming a combustion chamber or chambers of the engine, and in which:

the pair of opposed pistons can be rotated together in use at a common mean angular velocity about a common axis of rotation and are further arranged such that combustion in a combustion chamber or chambers of the engine can cause the pistons to oscillate relative to each other about their common rotational axis when so-rotating.

According to a fourth aspect of the present invention, there is provided a method of operating an internal combustion engine having a pair of opposed pistons and one or more cylinders within which the pistons move in use, the pistons and cylinder or cylinders together forming a combustion chamber or chambers of the engine, and wherein the pair of opposed pistons are each arranged to be rotatable in use about a common axis of rotation, the method comprising:

rotating the pair of opposed pistons about their common rotational axis to or at a non-zero common mean angular velocity; and using combustion in the combustion chamber or chambers of the engine to cause relative oscillatory motion of the pistons about their common rotational axis as the piston and cylinder rotate.

As will be appreciated by those skilled in the art, these aspects of the present invention can and preferably do include any one or more or all of the preferred and optional features of the invention described herein, as appropriate. Thus, for example, the pair of opposed pistons are preferably arranged as a mass-elastic system that is capable of resonance. Similarly, for example, one or other, and preferably both, of the pair of opposed pistons is preferably coupled to a generator assembly so as to generate an electrical output from the motion of the pistons in use.

The non-zero (greater than zero) common angular velocity in these aspects and embodiments of the invention is preferably predetermined, and will typically be selected based on the specific use of the internal combustion engine. In one preferred embodiment, the pair of opposed pistons are rotated (spun) in common at an angular velocity of about 2000 rpm.

The above motion of the pair of opposed pistons can be achieved in use in any suitable and desired manner.

Where the pistons each spin at common (mean) angular velocity, then they are preferably each accelerated to their greater than zero angular velocity prior to any combustion operations being performed, and indeed also preferably prior to the initiation of any oscillatory motion of the pistons.

Accordingly, the present invention preferably comprises means for or a step of rotationally accelerating the pair of opposed pistons about their common rotational axis to a, preferably predetermined, greater than zero common angular velocity, preferably prior to the initiation of any combustion events, and preferably prior to the initiation of any oscillatory motion of the pistons.

The pistons can be accelerated (spun) in this way by any suitable means. In a preferred embodiment the pistons are so-accelerated (spun) by operating the generator in its "motoring" mode of operation (where possible) (i.e. by applying an electrical current to the conducting elements of the generator so as to induce a torque on one or other, and preferably both, of the pistons, thereby causing the pistons to move relative to the fixed stator).

As discussed above, the one or more cylinders are preferably also arranged, in use, to rotate (spin) about the common axis of rotation at a given common (mean) angular velocity, and preferably at the same common (mean) angular velocity as the pair of opposed pistons.

This motion of the one or more cylinders can be achieved in any suitable and desired manner.

For example, the present invention may comprise an electric motor associated with the one or more cylinders and/or the support or supports of the one or more cylinders for rotationally accelerating the one or more cylinders about the common rotational axis to a greater than zero angular velocity (and preferably an angular velocity that equals the common (mean) angular velocity to which the pair of opposed pistons are accelerated).

As will be appreciated, in those embodiments in which the engine comprises an active means, such as an electric motor, for maintaining the alignment of each of the one or more cylinders with respect to a particular relative angular position of the pistons, then the same active means (e.g. motor) may be used as the means for rotationally accelerating the one or more cylinders.

In other embodiments, it is complemented that the one or more cylinders may be rotationally accelerated by (as a result of) the motion (rotational acceleration) of the pair of opposed pistons.

For example, in those embodiments of the present invention in which the one or more cylinders comprise closed cylinders (e.g. with each cylinder comprising a (stem) end cover), the motion of the pair of opposed pistons would result in one, or both, of the pistons contacting an end cover of the cylinder within which the piston or pistons move, thereby providing the required torque to accelerate the cylinder(s). The contact between the piston and cylinder may be a direct (solid) contact (e.g. with the underside or crown of, the piston contacting the cylinder body) or it may be an indirect contact (e.g. due to a cushion of (trapped) air being present between the underside or crown of the piston and the cylinder body).

Preferably, in embodiments in which the one or more cylinders are rotationally accelerated by the motion of the pistons (i.e. in a passive manner, rather than an active manner, such as by using an electric motor), the engine further comprises means to reduce, and preferably prevent, any damage being caused to the piston and/or cylinder from the required contact between the two components. Similarly, the engine may also comprise means to reduce the noise generated by the contact between the two components.

Further, in those embodiments in which the engine comprises a passive means for maintaining the alignment of each of the one or more cylinders with respect to a particular relative angular position of the pistons, it is also contemplated that the alignment maintaining means could be utilised as the means for rotationally accelerating the one or more cylinders.

It will similarly be appreciated that where the pistons and cylinder(s) are rotating at a given common angular velocity, in use, then the cylinder or cylinders may still be, and preferably are, kept in suitable relative alignment with the pistons as they rotate together by the active and/or passive means alignment maintaining means discussed above.

The relative oscillatory motion between the pair of opposed pistons can similarly be caused in any suitable and desired manner. For example, it could be started by combustion in the combustion chamber or chambers of the engine. However, in a preferred embodiment the oscillatory motion is started by operating the generator in its "motoring mode" of operation, before combustion is commenced. In this case, a torque will be induced or applied on one of the pistons (of the pair of opposed pistons) by the electric motor arrangement, and, preferably, at the same time, an opposite (preferably an equal, but opposite) torque is induced or applied on the other of the pistons by the electric motor arrangement, so as to cause the piston and cylinder to move and oscillate relative to each other.

Accordingly, in a preferred embodiment of the present invention, there is provided means for or a step of inducing or applying torques to the pair of opposed pistons (preferably inducing or applying a torque on one of the pistons, and simultaneously, inducing or applying an equal and opposite torque on the other of the pistons), so as to drive relative oscillation of the pair of opposed pistons.

As discussed above, this is preferably done prior to initiation of any combustion events and preferably after the pistons, and preferably the one or more cylinders, have been set spinning at a common angular velocity.

As discussed above, in operation of the system of the present invention, combustion in the combustion chamber or chambers of the engine formed by the pistons and cylinder(s) will be used to drive relative oscillation of the pistons. The combustion events will cause the pistons, due to their arrangement in a mass-elastic system, to oscillate relative to each other about their common axis.

Any suitable combustion arrangement and cycle, such as a 4-stroke or a 2-stroke cycle, can be used for this purpose.

As discussed above, the combustion is preferably only started after the pistons have already been set oscillating, and, most preferably, after they (and the one or more cylinders) have been set spinning as well. In other words, combustion is preferably used to drive the system after it has been started, i.e. after it has reached, and is in, its "steady state" condition.

As discussed above, the combustion process is preferably controlled (e.g. by controlling injection and/or ignition timings, etc.) so as to cause the pistons to resonate (i.e. to oscillate substantially at a resonant (natural) frequency of their mass-elastic system such that the relative oscillatory motion of the piston and cylinder will be amplified). This is possible because, as discussed above, the mass-elastic system formed by the pair of opposed pistons is capable of resonance at one or more, preferably predetermined or predefined, resonant (natural) frequencies.

In order to generate and drive such resonance, the combustion process is preferably controlled such that there will be appropriate periodic combustion events that will drive and maintain the resonance. Thus, in a preferred embodiment, the present invention comprises means for or a step of generating periodic combustion in the combustion chamber or chambers of the engine (formed by the pistons and cylinder(s)) so as to generate relative oscillation, and preferably resonant oscillation, between the pair of opposed pistons. The periodic combustion is preferably at the same frequency as the resonant (natural) frequency of the mass-elastic system (formed by the pistons, and preferably one or more resilient members).

As will be appreciated, the periodic combustion in the combustion chamber or chambers of the engine can lead, for example, to three types of self-excited (resonant) motion of the mass-elastic system: stable resonance (i.e. the normal, desired, operating condition of the engine), instability or stall.

Thus, in a preferred embodiment, the present invention comprises means for or a step of controlling the combustion process (e.g. by controlling a parameter or parameters associated with (related to) the cylinder pressure, such as, and preferably, the peak cylinder pressure or the mean cylinder pressure, in proportion to the top-dead-centre (TDC) error (i.e. so as to maintain the extreme locations of the pistons at the desired TDC positions)) and/or the motion of the pair of opposed pistons such that the periodic combustion in the combustion chamber or chambers causes the mass-elastic system to operate, in use, in a stable resonance condition.

For example, in a particularly preferred embodiment, the present invention further comprises means for or a step of applying controlling damping (torques) to one or other, and preferably both, of the moving pistons when the engine is in use. This may be desirable, e.g., to control and avoid excessive resonance build up in use.

Thus, in a preferred embodiment further control over the oscillatory motion of the pistons is provided and effected by damping the motion of one or other, and preferably both, of the pistons resulting from the combustion process, e.g., and preferably, by inducing or applying a torque that opposes the motion of the piston or pistons resulting from the combustion process. In an embodiment, equal, albeit opposite, oscillatory control (damping) torques are applied to each of the pair of opposed pistons in use (for this purpose).

It should be noted here that such "control" torques and damping are intended to be different to (and in addition to) any inherent damping effects due, for example, to friction (which would not be "controlled" or "controllable" in any event, and will, in any event, generally be negligible when compared to the additional, controlled damping deliberately applied to one or other, and preferably both, of the pistons).

Accordingly, in a preferred embodiment of the present invention, there is provided means for or a step of inducing and/or applying a torque on one or other, and preferably both, of the pistons that opposes the motion of the piston or pistons (e.g., and preferably to oppose the motion resulting from combustion). In other words, a control torque can be, and preferably is, applied to one or other, and preferably both, of the pistons, e.g., and preferably, to limit and control the motion of the piston or pistons (and preferably to control and limit the amplified oscillatory motion caused by combustion in the combustion chamber or chambers).

In a preferred embodiment, the motion of each of the pistons of the pair of opposed pistons can be controlled (damped) independently of each other. In other words, preferably separate control torques (damping) can be applied to each of the pistons.

The control torque(s), which effectively act as a damper in the mass-elastic system, can be caused, and effected in any suitable and desired manner. In a particularly preferred embodiment, the control torque(s) are generated (applied) using the motor-generator arrangement to drive the rotation of one or other, and preferably both, of the pair of opposed pistons, i.e. by applying a suitable electrical current to the conducting elements of the motor-generator arrangement associated with one or other of the pistons as appropriate.

In a preferred embodiment, the control torque(s) and damping is controlled based on one or more parameters of the oscillatory motion of the pistons (e.g. based on the angular velocity of the pistons) and/or on one or more parameters of the combustion process. For example, as the skilled person will understand, pressures in the combustion chamber or chambers due to combustion may vary with each combustion cycle. Preferably, therefore, the damping (control torque) is controlled to take account of this variability in the pressures in the combustion chamber or chambers.

Preferably the control torque(s) are based on, and preferably follow a stroke velocity feedback strategy (i.e. the control torque(s) are preferably feedback controlled). Accordingly, it will be appreciated that the control torque(s) will, in such embodiments, repeatedly change sign, i.e. oscillate between a clockwise (positive) torque and an anticlockwise (negative) torque), due to the oscillatory motion of each of the pistons.

In a particularly preferred embodiment, an alternating control torque is applied to each of the pistons that is phase controlled with respect to the frequency of the combustion process (the gas pressure excitation process). Most preferably it is phase controlled with respect to the first harmonic of the combustion process.

(The Applicants have recognised that the power generated by the power supply system, when in use (i.e. when the system is being used to generate electricity), is positive, despite the control torque(s), which are preferably applied to one or other, and preferably both, of the pistons, alternating between positive and negative.)

The power supply system of the present invention can be applied to any suitable power supply, e.g., vehicle and/or engine, arrangement.

In a particularly preferred embodiment, however, it forms part of a hybrid powertrain system in which the electrical output of the present invention is used in conjunction with a further motor-generator arrangement for generating a mechanical output. In other words, the output from the generator arrangement of the system of the present invention is preferably coupled to and used to drive an electric motor for generating a mechanical output (e.g., and preferably, for driving a vehicle).

The powertrain system that the present invention is used in preferably further comprises a means for storing electrical energy that is generated, such as, for example a battery. The stored energy may then be used, for example, to power electrical units or systems external to the powertrain. Thus, the output from the generator arrangement of the system of the present invention can be, and preferably is, coupled to and used to charge a battery or similar store for storing electrical energy.

In a particularly preferred embodiment of the present invention, since the pair of opposed pistons and the one or more cylinders can all rotate (spin) completely about their common rotational axis, the engine can itself act as, and preferably is used as, an energy store. In this case, the system (the pistons and cylinder(s)) would, effectively, be spun as, and act as, a flywheel so as to store kinetic energy. This energy could then, e.g., and preferably, be recovered as electrical energy through the generator action of the system of the present invention. In this case, the flywheel operation could, e.g., in a vehicle, be used as part of a regenerative braking system (a kinetic energy recovery and storage system (KERS)). Indeed, it is another important advantage of the system of the present invention that it can, in its preferred embodiments at least, be used as a flywheel to store kinetic energy in this manner.

Thus, in a particularly preferred embodiment, the system (the pistons and cylinder(s)) can be, and preferably is, operated as a flywheel arrangement in use, preferably driven by (and to recover) kinetic energy. Most preferably in these arrangements, kinetic energy to be recovered (e.g. from a vehicle whilst braking) can be used to generate electricity (e.g. in a motor generator arrangement) which is then used to drive (motor) the pistons (and thus, preferably, the cylinder(s)) so as to spin it as a flywheel, thereby storing the energy as kinetic energy. (that can later be recovered as electrical energy by using the system in its "generating" mode).

Indeed, it is believed that an arrangement comprising an internal combustion engine (having a pair of opposed pistons and one or more cylinders within which the pistons move in use) and a motor-generator arrangement which can both generate and be driven by electrical energy may be new and advantageous in its own right since such an arrangement can, for example, as discussed above, provide enhanced control of a generator arrangement and/or be used to operate the system as a flywheel so that energy can be stored for later recovery as electrical energy.

Thus, according to a fifth aspect of the present invention, there is therefore provided a power supply system, comprising:

an internal combustion engine having a pair of opposed pistons and one or more cylinders within which the pistons move in use, the pistons and cylinder or cylinders together forming a combustion chamber or chambers of the engine, and in which the pair of opposed pistons can be driven to move relative to each other by combustion in the combustion chamber or chambers of the engine; and an electrical motor-generator arrangement associated with the pair of opposed pistons for generating an electrical output from the motion of the pistons in use, and which motor-generator arrangement can further be used to drive motion of one or other, and preferably both, of the pistons in use.

According to a sixth aspect of the present invention, there is provided a method of operating a power supply system having an internal combustion engine having a pair of opposed pistons and one or more cylinders within which the pistons move in use, the pistons and cylinder or cylinders together forming combustion chamber or chambers of the engine, and in which the pair of opposed pistons can be driven to move relative to each other by combustion in the combustion chamber or chambers of the engine, and an electric motor-generator arrangement associated with the pair of opposed pistons, the method comprising:

using combustion in the combustion chamber or chambers to cause the pair of opposed pistons to move relative to each other; and at the same time or at a different time, using the electric motor-generator arrangement to drive motion of one or other, and preferably both, of the pistons.

As will be appreciated by those skilled in the art, these aspects of the present invention can, and preferably do, include any one or more or all of the preferred and optional features of the invention described herein, as appropriate. Thus, for example, the pair of opposed pistons and the one or more cylinders are preferably completely rotatable in use about a common axis of rotation. Further, the pair of opposed pistons are preferably arranged to oscillate with respect to each other about their common axis of rotation, and are preferably further arranged as a mass-elastic system that is capable of resonance.

Similarly, the system (the pistons and thus, preferably, the one or more cylinders) are preferably driven to rotate together as a flywheel by the electric motor so as to thereby store energy. In such embodiments, the pistons are preferably driven in this manner at a different time from the relative motion caused by combustion in the combustion chamber.

Similarly, when the pistons are being driven by combustion, the generated motion is preferably used to generate an electrical output via the motor-generator arrangement. Equally, in such an arrangement, the electric motor is preferably used, at least some of the time, to provide a simultaneous driving force on one or other, and preferably both, of the pistons (i.e. simultaneously with the motion caused by combustion), e.g., and preferably, to provide control and/or damping of the motion of the pistons caused by combustion, as discussed above.

The power supply system of the present invention may also be used as a stationary power generation unit. For example, it may used in, on or with trains, marine vessels and/or aerospace vehicles.

Other alterations and additions to the system of the present invention would be possible. For example, the motor-generator system can be driven through gearing. In this case, the (pair of) motor-generators of the rotating system, rather than being mounted to the piston parts, would be driven by the piston parts via gearing, e.g., and preferably, via epicyclic gearing. The (pair of) motor generators would still be coupled elastically via the gearing. The effect of using such gearing is that the torques and speeds of the pistons can (and will) differ from those of the motor-generators (e.g. the absolute angular velocity of the rotary part of the motor-generator can and will differ from the angular velocity of the associated piston or pistons). This will allow, for example, the magnitude of any control torques to be reduced. Although the apparent inertia of the geared system will be a dynamic factor to be considered, the overall effect will be that the control torque magnitudes can be further reduced.

As will be appreciated by those skilled in the art, all of the aspects and embodiments of the present invention described herein can and preferably do include any one or more or all of the preferred and optional features of the invention described herein, as appropriate.

The methods in accordance with the present invention may be implemented at least partially using software e.g. computer programs. It will thus be seen that when viewed from further aspects the present invention provides computer software specifically adapted to carry out a method or the methods herein described when installed on data processing means, a computer program element comprising computer software code portions for performing a method or the methods herein described when the program element is run on data processing means, and a computer program comprising code means adapted to perform all the steps of a method or of the methods herein described when the program is run on a data-processing system. The invention also extends to a computer software carrier comprising such software which when used to operate a power supply system comprising data processing means causes in conjunction with said data processing means said system to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which FIG. 1 shows a prior art single-cylinder internal combustion engine and associated generator arrangement;

Figure 1:
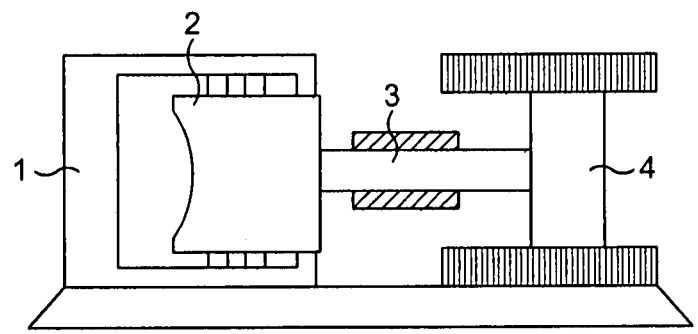
Figure 2:
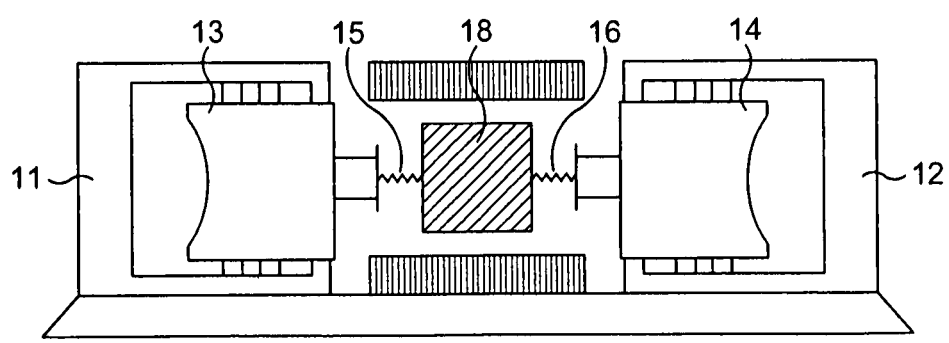
FIG. 2 shows an energy converter that comprises a free piston engine and generator arrangement.

A preferred embodiment of a power supply system that is in accordance with the present invention is shown in FIGS. 3 to 8. As discussed above, the power supply system comprises an internal combustion engine 20, and an electric motor-generator arrangement that is coupled to (associated with) the internal combustion engine.

The engine 20 has three co-axial (piston-supporting) discs: outer discs 24, and inner disc 26, which are mounted on bearings 47 to a static support shaft 40. These discs form the rotor parts of the motor-generator arrangement of the power supply system. All of the discs are able to rotate completely about the axis A (i.e. they can all spin (orbit) completely (through the full 360°) around the axis A, and none of the discs are (mechanically) fixed relative to the axis A).

Each of the discs 24, 25, 26 is arranged to be dynamically balanced in respect of its rotation by the appropriate distribution of the total mass, so that the net out-of-balance force and external torque on the engine in use can be zero.

A first toroidal section-shaped piston 28 is mounted between the two outer discs 24 and 25 (using a support element 49 as shown, for example, in FIGS. 3 and 6) such that the discs and piston form a single unit that is able to rotate completely about the axis A. Similarly, a second toroidal section-shaped piston 30 (shown in FIG. 5) is mounted to the inner disc 26—the first and second pistons 28, 30 together forming a pair of opposed pistons.

The pair of opposed pistons 28, 30 are single-crowned (single-headed) pistons in the present embodiment. It will be appreciated, however, that the pistons can be of any suitable and desired form, and could, for example, be double-headed pistons.

Figure 3:
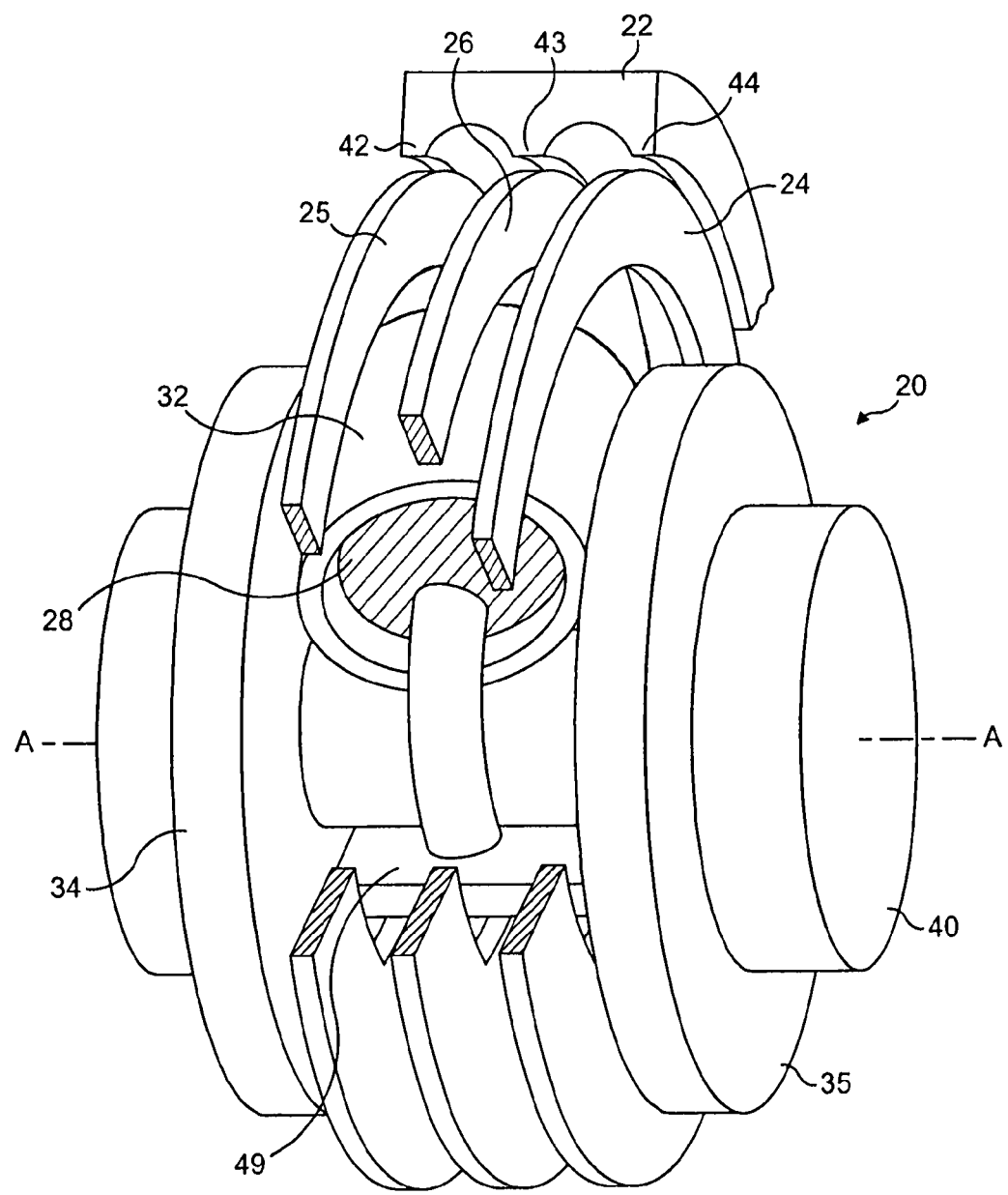
FIG. 3 shows an embodiment of a power supply that is in accordance with the present invention.
Figure 4:
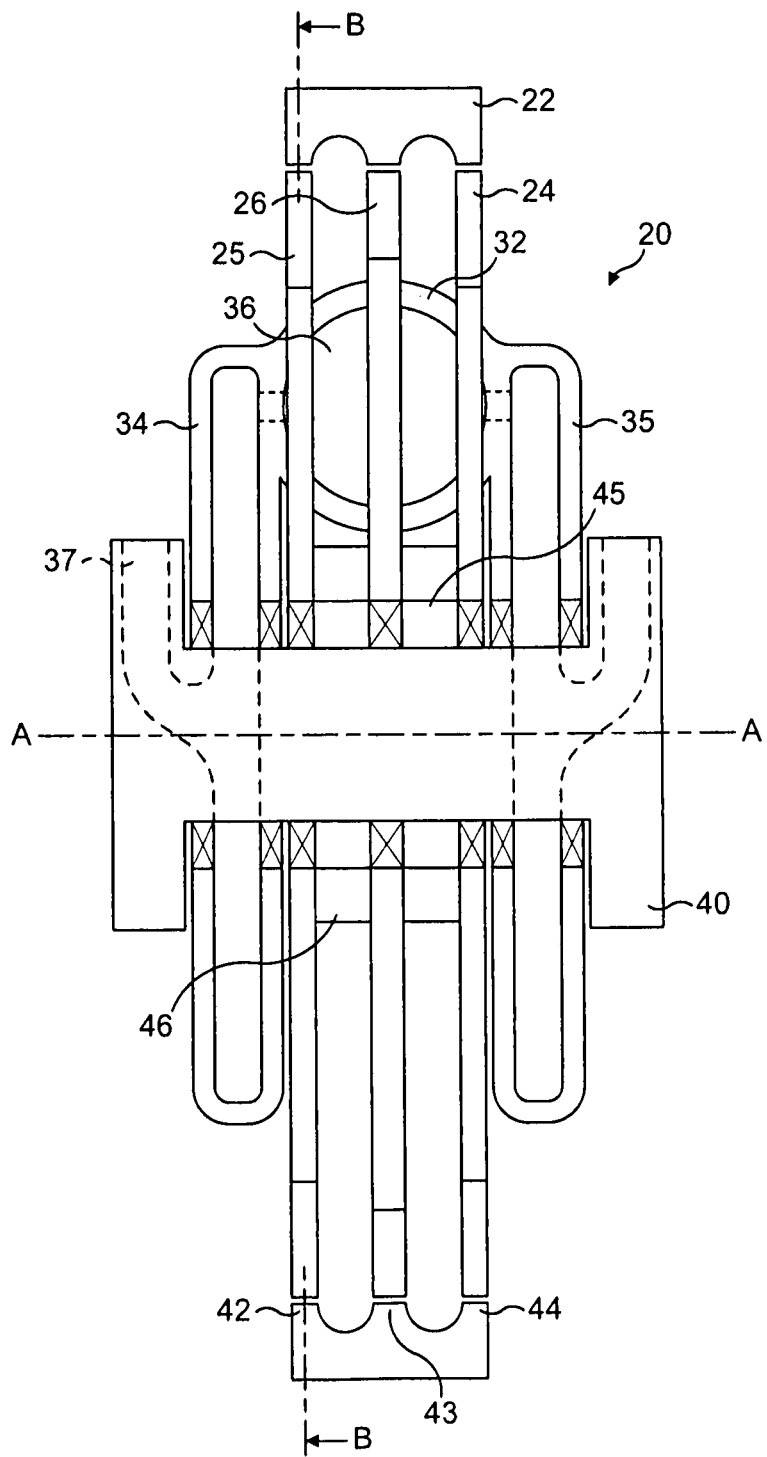
FIG. 4 shows a cutaway view of the system shown in FIG. 3.
Figure 5:
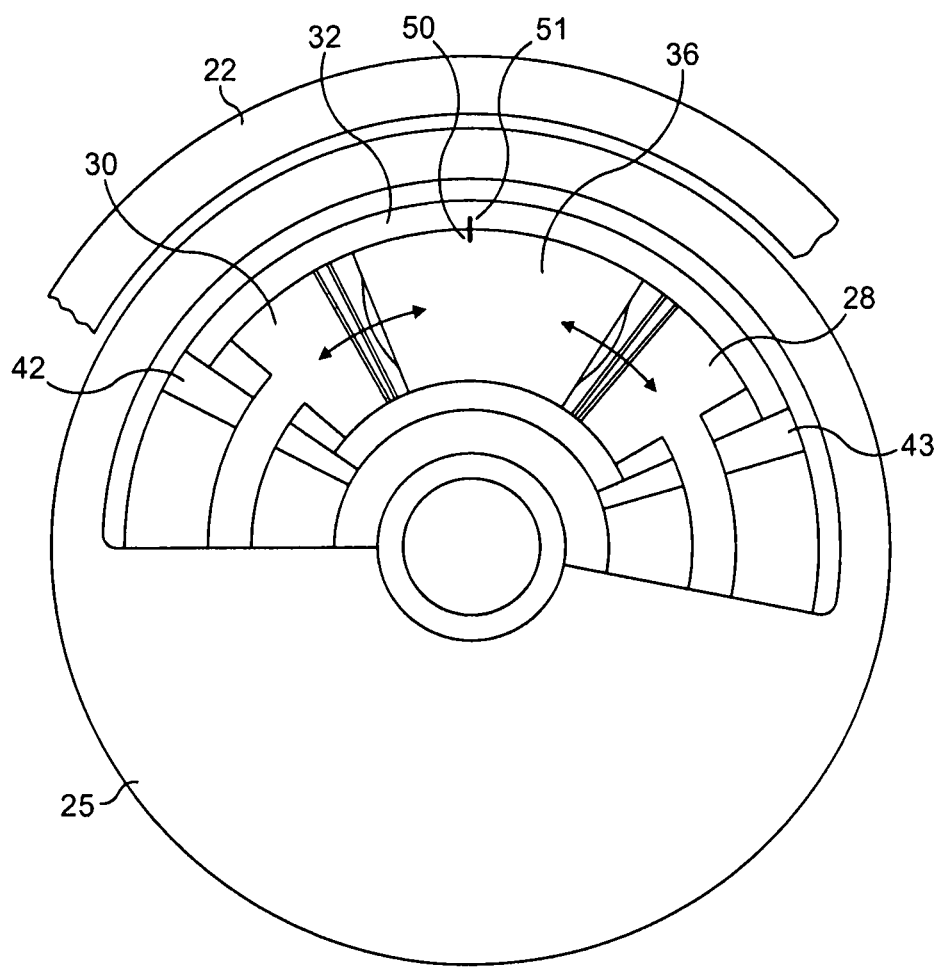
FIG. 5 shows a cutaway view of the system shown in FIG. 3 when viewed along the rotation axis A (line B-B shown in FIG. 4)
Figure 6:
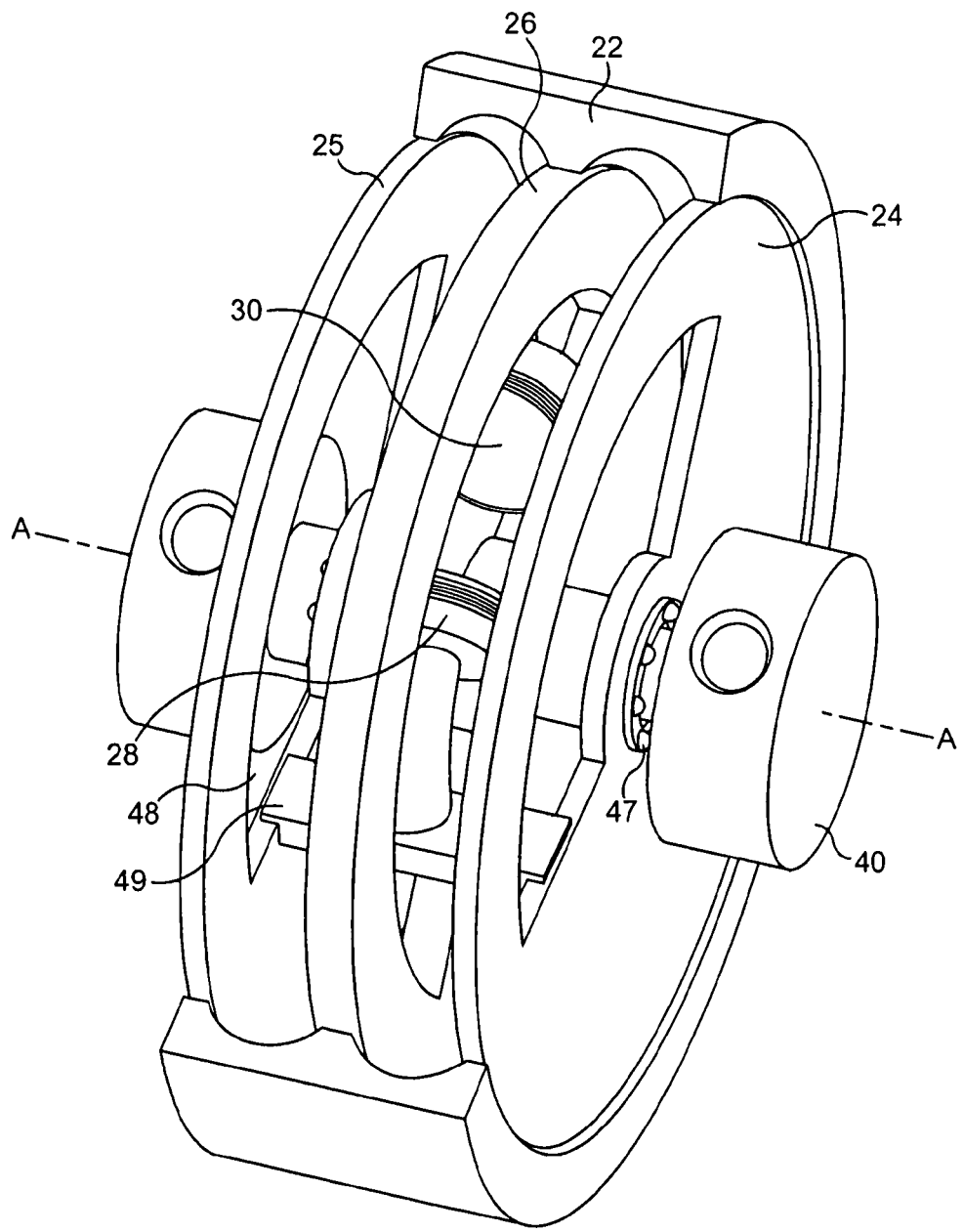
FIGS. 6 to 8 show different views of the system of FIG. 3 with the cylinder removed.
Figure 7:
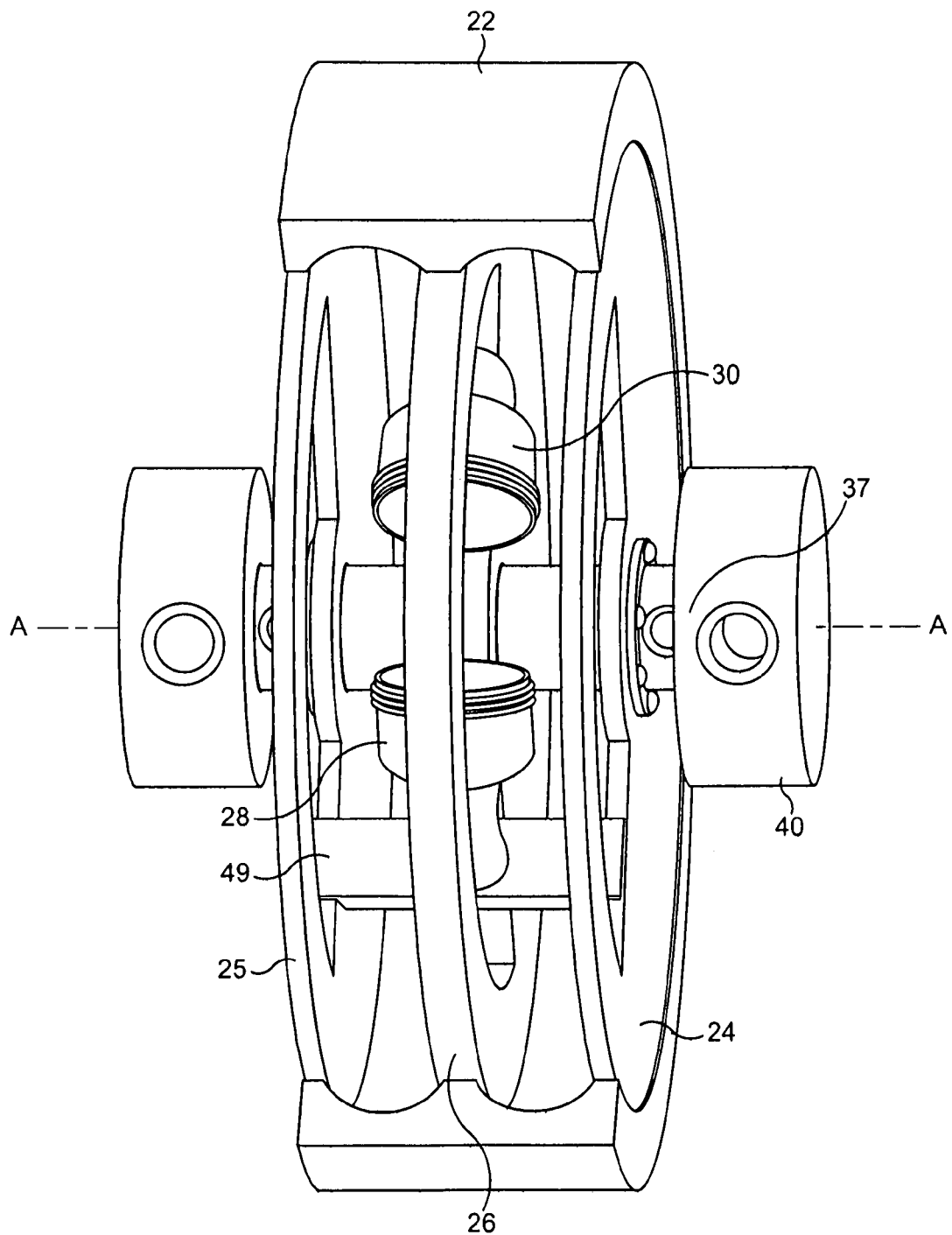
Figure 8:
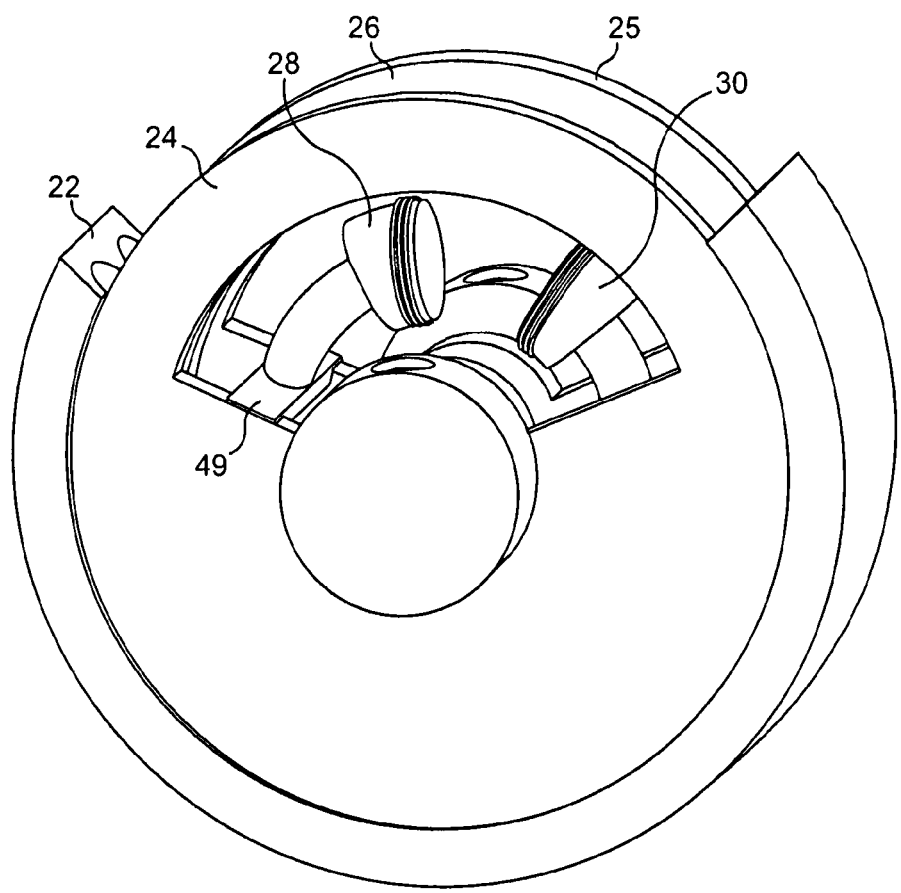

As shown in FIGS. 3 to 5, the first and second pistons 28, 30 move within (mate with) a toroidal section-shaped cylinder 32 that is mounted between two co-axial (cylinder-supporting) discs 34, 35. The discs 34 and 35, as with the piston-supporting discs discussed above, are able to rotate completely about the axis A as a single unit. (The cylinder 32, which normally passes through the openings 48 in each of the two outer discs 24,25 and the inner disc 26, and its associated supporting discs 34,35 are not shown in FIGS. 6 to 8 so as to more clearly show the manner in which the pair of opposed pistons 28 and 30 are arranged within the engine.)

As will be discussed in more detail below, the pair of opposed pistons 28, 30 move with an oscillatory motion within the cylinder 32 so as to create a variable volume cavity 36 in which combustion takes place (i.e. a combustion chamber).

The cylinder 32, in the present embodiment, comprises a single cylinder having stem end covers 42, 43 (see FIG. 5), and wherein each of the end covers has a gland through which the rod of the respective piston passes.

It will be understood, however, that the cylinder 32 could alternatively be divided into two separate chambers using a partition so as to effectively double the number of cylinders. In such an embodiment, the piston 28 will move within one of the two chambers (thus defining a first combustion chamber) and the piston 30 will move within the other of the two chambers (thus defining a second combustion chamber). A similar structure could also be achieved by forming the cylinder as two cylinders, each closed at the blind end, and positioned in a back-to-back arrangement.

The pair of opposed pistons 28 and 30 are arranged in a rotary mass-elastic system with a definite resonant (natural) frequency, i.e. a frequency at which the system will resonate, by connecting a first machined torsion spring 45 between the outer disc 24 and the inner disc 26, and by connecting a second machined torsion spring 46 between the outer disc 25 and the inner disc 26. The first and second springs are constructed so as to have opposing pitch, therefore meaning that any axial force generated by the first spring is cancelled out by an opposing axial force generated by the second spring.

It will be appreciated, however, that the rotary mass-elastic system could be formed in any suitable and desired manner. For example, the rotary mass-elastic system could also be formed by mutually restraining each of the pistons 28 and 30 by a pair of circumferentially extending pre-compressed helical springs.

As will be appreciated, the combustion chamber 36 is formed within the internal volume of the cylinder 32, and the volume of the cavity is varied by the respective (oscillatory) motion of the pistons 28 and 30. In other words, and as shown in FIG. 5, at any one time, the pistons 28 and 30 are either moving towards each other or away from each other (i.e. with one piston moving in a clockwise direction about the axis A, whilst the other piston is moving in a respective anticlockwise direction about the axis A). Thus, and as discussed in more detail below, the volume of the chamber 36 is at a minimum when both pistons 28, 30 are at top-dead-centre (TDC) (at which point the pistons change from moving towards each other to moving away from each other) and at a maximum when both pistons 28, 30 are at bottom-dead-centre (BDC) (at which point the pistons change from moving away from each other to moving towards each other).

Accordingly, the cylinder 32 itself does not oscillate, in use, but remains stationary, or, as is discussed further below, rotates at a substantially constant angular velocity about the axis A. Thus, components, such as fuel injectors, sensors, etc, can be mounted to the cylinder without having to endure oscillatory accelerations (as would be the case if they were mounted, for example, to the pistons 28, 30 or the piston-supporting discs 24, 25, 26).

As will be recognised, since the cavity 36 is used as a combustion chamber of the engine 20, the engine is also provided with means for transferring air and fuel (as a liquid or a gas) to the cavity 36, an ignitor (not shown) and means for expelling exhaust gases from the cavity 36. For example, and as shown in FIG. 4, internal passages 37 are provided in the static support shaft 40 for supplying the air and fuel to the cavity 36, and for removing the exhaust gases from the cavity 36.

The means for removing the exhaust gases from the cavity 36 is, at least in some embodiments, of a form that would allows exhaust gases to be recirculated, i.e. exhaust gas recirculation (EGR) to be performed, to reduce NOx emissions from the engine as is known in the art.

The supply of air and fuel to the chamber 36, and the expulsion of exhaust gases from the chamber 36, is controlled using inlet and exhaust valves. Such valves can be cam driven, or operated hydraulically, pneumatically or using solenoids, and can in some embodiments be operated with variable-valve-timing (VVT).

In those embodiments discussed above, wherein the cylinder is constructed such that each piston forms its own combustion chamber, it will be appreciated that each of the chambers will be provided with inlet and exhaust valves, an ignitor, etc, thereby allowing the combustion processes occurring in each chamber to be individually controlled.

The cylinder-supporting discs 34, 35 are required, in the present embodiment, to be maintained in a desired position relative to the piston-supporting discs 24, 25, 26 when the engine is in use. In other words, the cylinder 32 is required to be maintained in a desired alignment with respect to a position in the envelope defined by the movement of the pistons. For example, and as shown in FIG. 5, the location 51 on the cylinder-supporting discs 34, 35 is desired to be kept in alignment with the location 50 on the piston-supporting discs 24, 25, 26.

The location 50 to which the cylinder is aligned may be any desired position. For example, the cylinder 32 might need to be positioned midway between the pair of opposed pistons 28, 30 in order to be suitably aligned with inlet and exhaust ports of the chamber 36, or it might need to be aligned to some other position relative to the midway position so as to aligned appropriately for valve ports.

The means used to maintain the alignment of the cylinder 32 may be of any suitable and desired form.

For example, a passive means of maintaining the cylinder in alignment with the midway position between the pistons is to use the underside air pressure of the pistons 28 and 30. In other words, by constructing the engine 20 such that the volume between the underside of each of the pistons 28, 30 and the respective end cover 42, 43 are of the same size, then if the cylinder 32 were to drift to either side of the midway position, the underside volumes would become different, and the difference in air pressure (associated with each individual volume) would create a resultant restorative force to realign the cylinder. (The relative volumes could, or course, be selected, in other embodiments, so as to position the cylinder in any position relative to the midway position as desired).

Other passive means of maintaining the alignment of the cylinder include: (i) using repelling magnets on the underside of each of the pistons; (ii) using air-cushioning created by a spigot on the underside of each of the pistons; (iii) providing a nudging buffer for each piston, created by the pistons contacting a durable material or a spring; or (iv) providing ports associated with each piston, the ports being arranged to release air from the underside of the pistons that escapes over vanes or blades so as to create the desired restorative force.

The means used to maintain the alignment of the cylinder may also take the form of an active means by providing an electric motor, e.g. a stepper motor, (associated with the cylinder-supporting discs 34, 35) for controlling the position of the cylinder.

In the present embodiment, i.e. that shown in FIGS. 3 to 8, the engine 20 comprises a single pair of opposed pistons, namely pistons 28 and 30, that move within a single cylinder 32. In other embodiments, however, the engine may comprise a plurality of such pairs of opposed pistons so as to, for example, increase the power-to-weight ratio of the engine.

Figure 9:
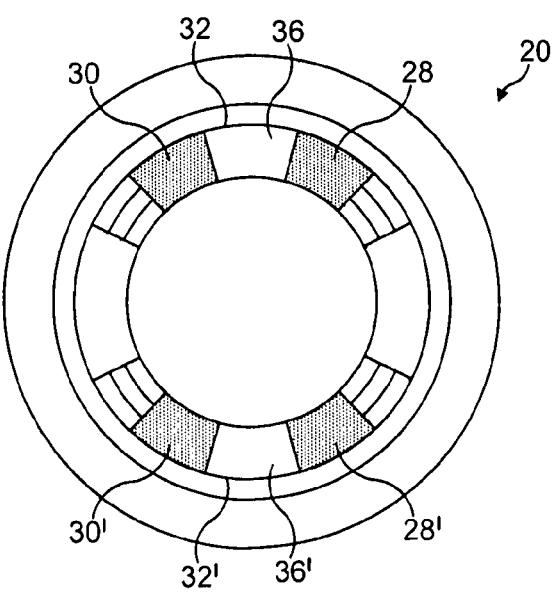
FIG. 9 shows another embodiment of a power supply system that is in accordance with the present invention.

For example, an embodiment of the present invention is shown in FIG. 9 that has two pairs of opposed pistons and two cylinders, with the first pair of pistons 28 and 30 moving within a first cylinder 32, and the second pair of pistons 28' and 30' moving within a second cylinder 32'. (In such embodiments, the engine could be provided with means to deactivate one of the cylinders, as is known in the art, thereby allowing the power generated by the engine to be reduced.)

Arranged on the inside surface of a housing 22 (that surrounds the piston-supporting discs) are three sets of conducting elements 42, 43 and 44. Each of these conducting elements is associated with one of the three co-axial piston-supporting discs 24, 25, 26 of the engine, which (i.e. the discs) have one or more permanent magnets provided around their circumference. As can be seen from FIGS. 3 and 4, conducting elements 42 are associated with, and form a stator to, the outer disc 24. Similarly, conducting elements 43 are associated with the inner disc 26, and conducting elements 44 are associated with the outer disc 25.

Alternatively, in other embodiments, the one or more permanent magnets can be provided on the inner surface of the housing 22, whilst the conducting elements are provided on the circumferences of the piston-supporting discs 24, 25 and 26.

It will be appreciated that the piston-supporting discs and the housing therefore form a motor-generator arrangement, with the discs forming the rotating elements (rotors) of the arrangement, and the housing forming the stationary elements (stator) of the arrangement. Thus, in one mode of operation, the rotation of the piston-supporting discs 24, 25, 26 relative to the housing 22 (i.e. the movement of the one or more permanent magnets relative to the conducting elements) induces an electric current in the conducting elements. Conversely, in another mode of operation, the discs 24, 25 and 26 can be caused to rotate, by applying an electric current to the conducting elements.

The operation of a power supply system in accordance with the present invention will now be described with reference to the embodiment as shown in FIGS. 3 to 8.

The piston-supporting discs 24, 25, 26 are initially accelerated to a predetermined angular velocity by "motoring" the discs using the motor-generator. For example, the discs 24, 25, 26 are each accelerated until all the discs (and thus the pair of opposed pistons 28, 30) are rotating, e.g. in a clockwise direction, about the axis A at a predetermined angular velocity. The angular velocity of the discs is chosen so as to allow the motor-generator to operate at its optimum efficiency, and is typically selected to be around 2000 rpm.

Similarly, the cylinder-supporting discs 34, 35 (and thus the cylinder 32) are also initially accelerated to the same predetermined angular velocity as the piston-supporting discs 24, 25, 26.

The cylinder-supporting discs may be rotationally accelerated, for example, using an electric motor, which could also be used, as discussed above, to maintain the alignment of the cylinder when the engine is in use (i.e. in normal (steady-state) operation).

Alternatively, the cylinder-supporting discs may be rotationally accelerated using the rotating pistons to drive the rotation of the cylinder (and thus that of the cylinder-supporting discs). For example, depending on the direction in which the piston-supporting discs are rotated, in the present embodiment, either the piston 28 will contact the end cover 43 of the cylinder or the piston 30 will contact the end cover 42 of the cylinder, and this contact will provide the torque necessary to accelerate the cylinder. (As will be appreciated, the contact may be a direct (solid) contact between the components or, alternatively, an indirect contact, for example, with a cushion of air being trapped between the components.)

The motor-generator is then used to initiate an oscillatory motion between the pair of opposed pistons 28 and 30, which is superimposed on the above described common angular velocity. This motion is achieved by applying equal, but opposite, torques to the outer piston-supporting discs 24, 25 and the inner piston-supporting disc 26, respectively. For example, the absolute angular velocity of the outer discs 24, 25'(which effectively form a single unit) are increased by the application of a clockwise torque, while, simultaneously, the absolute angular velocity of the inner disc 26 is decreased by the application of an anti-clockwise torque of equal magnitude.

The engine 20 is able to operate in a 2-stroke cycle or a 4-stroke cycle. For example, when operating in a four-stroke cycle, the pair of opposed pistons 28, 30 are initially located at their equilibrium positions (as defined by the mass-elastic system), for example, with each piston being part-way between top-dead-centre (TDC) and bottom-dead-centre (BDC). Equal, but opposite, torques are then applied to the piston-supporting discs 24, 25, 26 causing the volume of the combustion chamber 36 to increase and thus for fuel and air to be drawn or injected into the chamber. However, since the motion of the pistons 28, 30 is restrained by the torsion springs (or, for example, by helical springs), the motion of each of the pistons is subsequently reversed thus causing the fuel and air mixture in the chamber to be compressed. Following this compression stroke, the compressed fuel and air mixture is ignited forcing the pair of opposed pistons 28, 30 to move apart. Finally, and following completion of the combustion stroke, each of the pistons again reverses direction thus expelling the exhaust gases from the chamber 26.

Under the action of the gas pressure from combustion, which is controlled to occur at the resonant (natural) frequency of the mass-elastic system formed by the pair of opposed pistons 28, 30, the system undergoes resonance, thereby amplifying the motion of the piston and cylinder.

As will be appreciated, when the engine 20 is in use, the combustion in the chamber 36 can lead to three types of self-excited motion of the power supply system, namely: stable resonance (the desired, normal, operating condition of the power supply system); instability; or stall.

To ensure that the system is operating in the "stable resonance" mode of operation, the motion of the pair of opposed pistons 28, 30 and the combustion process within the chamber 36 needs to be controlled.

Thus, the amplitude of the oscillatory motion of the pair of opposed pistons 28, 30 is controlled by applying a control torque to the outer piston-supporting discs 24; 25 and the inner piston-supporting disc 26 using the motor-generator arrangement which opposes the motion caused by combustion. These applied control torques, which are equal and opposite, are appropriately phase-controlled with respect to the first harmonic of the gas pressure excitation process. Accordingly, and as the skilled person will appreciate, the control torques act as artificial damping, and will follow a stroke velocity feedback strategy (i.e. the torque is controlled in proportion to the stroke velocity).

As the combustion gas pressures are not perfectly periodic, but are in fact cyclo-stationary with, potentially, substantial cycle-to-cycle variability, the control torques applied to the piston-supporting discs will also tend not to be periodic but will vary from cycle to cycle.

The combustion process in the chamber 36 is also controlled (so as to ensure operation in the "stable resonance" mode) according to a combustion control strategy, in which, for example, the peak or mean cylinder pressure is controlled in proportion to the top-dead-centre (TDC) error, so as to maintain the desired TDC positions of the pistons 28, 30.

Typically, the above described torque control allows the pair of opposed pistons 28, 30 to oscillate without any collisions (between the pistons or between a piston and the cylinder) at the TDC and BDC positions of the pistons. However, under abnormal conditions, it may be possible for collisions to occur. Accordingly, the system may be provided with an annular spigot and/or blind air-filled dummy cylinder arrangement to prevent any such collisions.

Once the engine 20 has been set in its "steady state" rotating motion, with resonant oscillation being driven by internal combustion in the combustion chamber 36, then the motor-generator arrangement can be used to generate an electrical output from the engine's motion (from the rotation of the piston-supporting discs 24, 25, 26).

The Applicants have found that the average electrical power output from the system is effectively, if the friction and electrical losses are ignored, equal to the average work done per unit time in expanding the combustion gas pressures. Accordingly, the system may provide close to 100% mechanical-to-electrical conversion efficiency.

As the skilled person will appreciate, the magnitude of the $i^2R$ loss increases with the magnitude of the control torques. Therefore, it is contemplated that gearing may be used to drive the generator-motor arrangement.

As described above, the power supply system can be used to generate an electrical output. Furthermore, however, the system can also be used as an energy store. In particular, the piston-supporting discs 24, 25, 26 can act as flywheels, i.e. an electrical input applied to the motor-generator arrangement can be used to rotate the discs 24, 25, 26, therefore storing the electrical energy in the form of mechanical energy (for later recovery as electrical energy by running the system in a "generating" mode).

The present invention is particularly, albeit not exclusively, applicable to use in hybrid powertrains.

Figure 10:
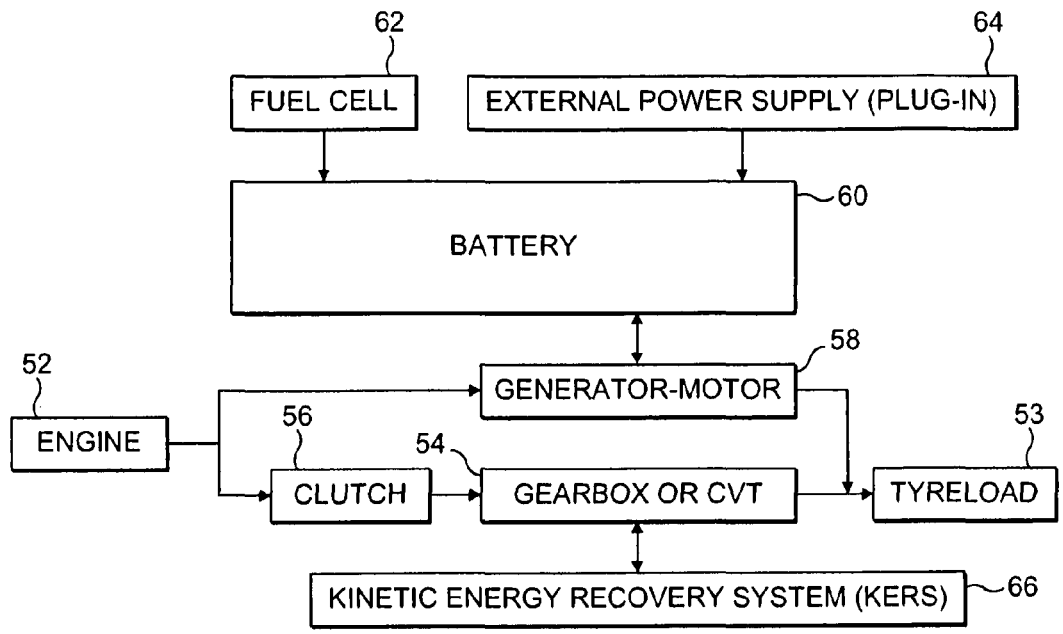
FIG. 10 shows an example of a conventional hybrid powertrain system.

A conventional hybrid powertrain is shown in FIG. 10, in which an engine 52 is connected to the tyreload 53, firstly via a clutch 56 and gearbox or CVT (continuously variable transmission) 54 (as in conventional powertrains), and secondly via an electric generator-motor 58. In such arrangements, and as is well known in the art, the wheels of the vehicle can be driven using the engine 52 or the motor-generator 58. A energy store 60, such as a battery, is also provided to store excess charge and/or to supply electrical energy to the motor generator 58. The energy store 60 can be supplied (re-charged) with electrical energy, for example, using a fuel cell 62 or by being connected to an external power supply 64 such as mains power. A kinetic energy recovery system (KERS) 66, which comprises a flywheel or the like, is also connected to the gearbox or CVT 64 for storing energy (as kinetic energy) generated during a braking manoeuvre and then releasing the (stored) energy as the vehicle accelerates.

Figure 11:
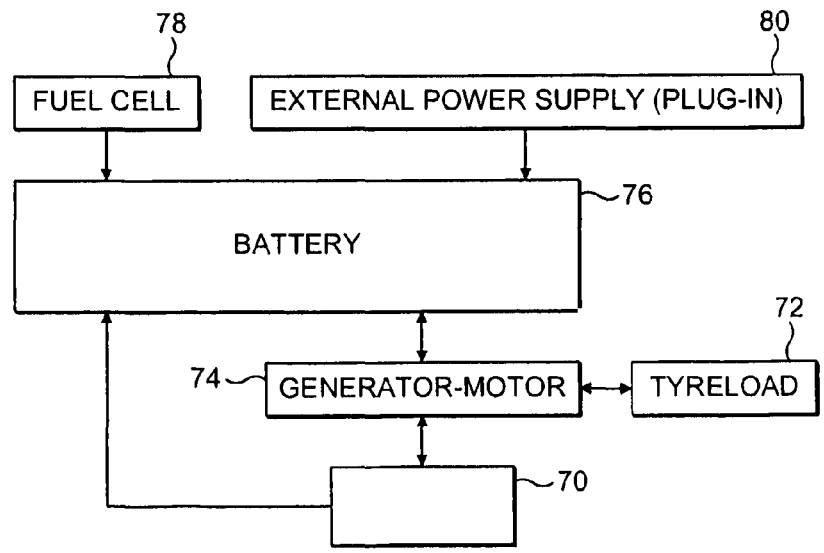
FIG. 11 shows an exemplary hybrid powertrain system utilising a power supply that is in accordance with the present invention.

A hybrid vehicle powertrain utilising a power supply system according to an embodiment of the present invention is shown in FIG. 11. In this arrangement, a power supply system 70 in accordance with the present invention is connected to a motor-generator 74, which in turn is connected to the tyreload 72. Accordingly, in operation, the power supply system 70 is used to generate an electrical output that is supplied to the motor-generator 74, which in turn generates a mechanical output that is used to drive the wheels of the vehicle.

The power supply system 70 can, however, also be used, as described above, as an energy store (e.g. by acting as a flywheel storage system), and thus kinetic energy from, for example, braking can be supplied to the motor-generator 74 and in turn converted to an electrical input for driving the piston-supporting discs of the engine of the power-supply system 70 as a flywheel in the manner discussed above. In other words, the power supply system 70 functions as a kinetic energy recovery system (KERS).

As with the conventional arrangement shown in FIG. 10, the motor-generator 74 is connected to an energy store 76, such as a battery, that is in turn connected to and/or is connectable to, for example, a fuel cell 78 and an external power supply 80. The energy store 76 is further connected to the power supply system 70, and thus can also be supplied (store) energy from the power supply system 70.

(It would also be possible to connect the electrical output of the power supply system 70 to, for example, one or more electrical appliances, in addition to or instead of it being coupled to the generator-motor 74 and the energy store 76.)

As will be appreciated by those skilled in the art, various changes and modifications may be made to the above described embodiments whilst still falling within the scope of the present invention as set forth in the accompanying claims.

As can be seen from the above, the present invention provides a power supply system that can, in its preferred embodiments at least, offer significant weight reductions and improvements in efficiency, thereby making it particularly, albeit not exclusively, suitable for automotive hybrid power supply systems. This is achieved, in the preferred embodiments of the present invention at least, by generating electrical power using two elastically-coupled "rotors" within a twin motor-generator system. Each of the rotors includes an orbiting toroidal-section-shaped piston, which together form a pair of opposed pistons, that move within (mate with) an orbiting toroidal-section-shaped cylinder. Both rotors spin forward at the same mean speed but oscillate relative to each other through combustion gas-pressure induced resonance. Appropriately controlled motor-generator torques are used to prevent resonance build-up. At the same time, output electrical energy is generated.

The invention claimed is:

1. A power supply system, comprising:
an internal combustion engine having a pair of opposed pistons and one or more cylinders within which the pistons move in use, the pistons and cylinder or cylinders together forming a combustion chamber or chambers of the engine, and wherein the pair of opposed pistons and the one or more cylinders are each arranged to be rotatable in use about a common axis of rotation, the pair of opposed pistons being further arranged such that combustion in the combustion chamber or chambers of the engine can cause the pistons to oscillate relative to each other about their common rotational axis, and the opposed pistons further being arranged to together comprise a mass-elastic system that is capable of resonance wherein the opposed pistons are coupled to one or more resilient members so as to form the mass elastic system that is capable of resonance; and
an electric generator arrangement associated with the pair of opposed pistons for generating an electrical output from the motion of at least one of the pistons in use.

2. The power supply system of claim 1, wherein the generator arrangement comprises a rotor and a stator, the rotor comprising at least one of the opposed pistons and the stator comprising a fixed casing at least partially surrounding the piston or pistons.

3. The power supply system of claim 1, comprising:
a motor-generator arrangement for generating electricity from the motion of at least one of the opposed pistons and for driving or controlling rotational motion of the at least one piston.

4. The power supply system of claim 1, wherein the pair of opposed pistons are each formed as toroidal sections that move within one or more toroidal-section shaped cylinders.

5. The power supply system of claim 1, wherein the pair of opposed pistons are arranged to be rotated in use at a common mean angular velocity about their common axis of rotation and are further arranged such that combustion in the combustion chamber or chambers of the engine can cause the pistons to oscillate relative to each other about the common rotational axis when so-rotating.

6. The power supply system of claim 1, further comprising means for maintaining the alignment of each of the one or more cylinders with respect to a particular relative angular position of the opposed pistons.

7. The power supply system of claim 1, comprising:
means for inducing or applying torques to the pair of opposed pistons so as to drive relative oscillation of the pistons.

8. The power supply system of claim 1, comprising:
a controller that generates periodic combustion in the combustion chamber or chambers of the engine so as to generate resonant oscillation between the pistons.

9. The power supply system of claim 1, comprising:
a controller that induces or applies a control torque to at least one of the opposed pistons that opposes the motion of the respective piston or pistons.

10. A hybrid powertrain, comprising:
a power supply system that generates an electrical output, the power supply system comprising:
an internal combustion engine having a pair of opposed pistons and one or more cylinders within which the pistons move in use, the pistons and cylinder or cylinders together forming a combustion chamber or chambers of the engine, and wherein the pair of opposed pistons and the one or more cylinders are each arranged to be rotatable in use about a common axis of rotation, the pair of opposed pistons being further arranged such that combustion in the combustion chamber or chambers of the engine can cause the pistons to oscillate relative to each other about their common rotational axis, and the opposed pistons further being arranged to together comprise a mass-elastic system that is capable of resonance wherein the opposed pistons are coupled to one or more resilient members so as to form the mass elastic system that is capable of resonance, and
an electric generator arrangement associated with the pair of opposed pistons for generating an electrical output from the motion of at least one of the pistons in use;
a motor-generator arrangement coupled to the power supply system for generating a mechanical output; and
an energy store that stores electrical energy coupled to the power supply system or the motor-generator arrangement.

11. A method of generating an electrical output using an internal combustion engine having a pair of opposed pistons and one or more cylinders within which the pistons move in use, the pistons and cylinder or cylinders together forming a combustion chamber or chambers of the engine, and wherein the pair of the opposed pistons and the one or more cylinders are each arranged to be rotatable in use about a common axis of rotation, the pair of opposed pistons being further arranged such that combustion in the combustion chamber or chambers of the engine can cause the pistons to oscillate relative to each other about their common rotational axis, and the opposed pistons further being arranged to together comprise a mass-elastic system that is capable of resonance wherein the opposed pistons are coupled to one or more resilient members so as to form the mass elastic system that is capable of resonance, the method comprising:
- using combustion in the combustion chamber or chambers to cause relative oscillatory motion of the pistons about their common rotational axis; and
- using a generator arrangement associated with the pair of opposed pistons so as to generate an electrical output from the motion of at least one of the pistons.

12. The method of claim 11, comprising:
rotationally accelerating the pair of opposed pistons about their common rotational axis to a greater than zero common angular velocity.

13. The method of claim 11, comprising:
maintaining the alignment of each of the one or more cylinders with respect to a particular relative angular position of the opposed pistons.

14. The method of claims 11, comprising:
inducing or applying torques to the pair of opposed pistons to drive relative oscillation between the pistons.

15. The method of claims 11, comprising:
generating periodic combustion in the combustion chamber or chambers of the engine to generate resonant oscillation between the pistons.

16. The method of claim 11, comprising:
inducing or applying a control torque to at least one of the opposed pistons that opposes the motion of the respective piston or pistons.

17. A non-transitory computer readable storage medium having computer readable code embodied on said computer readable storage medium, the computer readable code for programming a computer to perform a method of generating an electrical output using an internal combustion engine having a pair of opposed pistons and one or more cylinders within which the pistons move in use, the pistons and cylinder or cylinders together forming a combustion chamber or chambers of the engine, and wherein the pair of the opposed pistons and the one or more cylinders are each arranged to be rotatable in use about a common axis of rotation, the pair of opposed pistons being further arranged such that combustion in the combustion chamber or chambers of the engine can cause the pistons to oscillate relative to each other about their common rotational axis, and the opposed pistons further being arranged to together comprise a mass-elastic system that is capable of resonance, the method comprising:
- using combustion in the combustion chamber or chambers to cause relative oscillatory motion of the pistons about their common rotational axis wherein the opposed pistons are coupled to one or more resilient members so as to form the mass elastic system that is capable of resonance; and
- using a generator arrangement associated with the pair of opposed pistons so as to generate an electrical output from the motion of at least one of the pistons.

18. A powered system, comprising:
a vehicle, the vehicle includes:
an internal combustion engine having a pair of opposed pistons and one or more cylinders within which the pistons move in use, the pistons and cylinder or cylinders together forming a combustion chamber or chambers of the engine, and wherein the pair of opposed pistons and the one or more cylinders are each arranged to be rotatable in use about a common axis of rotation, the pair of opposed pistons being further arranged such that combustion in the combustion chamber or chambers of the engine can cause the pistons to oscillate relative to each other about their common rotational axis, and the opposed pistons further being arranged to together comprise a mass-elastic system that is capable of resonance wherein the opposed pistons are coupled to one or more resilient members so as to form the mass elastic system that is capable of resonance; and
an electric generator arrangement associated with the pair of opposed pistons for generating an electrical output from the motion of at least one of the pistons in use.

* * * * *